United States Patent
Berger et al.

(10) Patent No.: US 11,166,159 B1
(45) Date of Patent: Nov. 2, 2021

(54) METHODS AND APPARATUS FOR SECURE FINE TIMING MEASUREMENT WITH ENCODED LONG TRAINING FIELDS

(71) Applicant: Marvell International Ltd., Hamilton (BM)

(72) Inventors: Christian Raimund Berger, San Jose, CA (US); Liwen Chu, San Ramon, CA (US); Sudhir Srinivasa, Campbell, CA (US); Niranjan Grandhe, San Jose, CA (US)

(73) Assignee: Marvell Asia PTE, Ltd., Singapore (SG)

( * ) Notice: Subject to any disclaimer, the term of this patent is extended or adjusted under 35 U.S.C. 154(b) by 770 days.

(21) Appl. No.: 16/005,437

(22) Filed: Jun. 11, 2018

Related U.S. Application Data

(60) Provisional application No. 62/518,399, filed on Jun. 12, 2017.

(51) Int. Cl.
| | |
|---|---|
| *H04W 12/08* | (2021.01) |
| *H04L 29/06* | (2006.01) |
| *H04L 9/06* | (2006.01) |
| *H04L 12/26* | (2006.01) |
| *H04W 64/00* | (2009.01) |
| *G01S 11/00* | (2006.01) |

(52) U.S. Cl.
CPC .............. *H04W 12/08* (2013.01); *G01S 11/00* (2013.01); *H04L 9/06* (2013.01); *H04L 43/0864* (2013.01); *H04L 63/1466* (2013.01); *H04L 69/22* (2013.01); *H04W 64/00* (2013.01)

(58) Field of Classification Search
CPC ....... H04W 12/08; H04W 64/00; G01S 11/00; H04L 9/06; H04L 43/0864; H04L 63/1466; H04L 69/22
See application file for complete search history.

(56) References Cited

U.S. PATENT DOCUMENTS

| | | | | |
|---|---|---|---|---|
| 2014/0376355 | A1* | 12/2014 | Kudo | H04W 72/0453 370/203 |
| 2016/0366548 | A1* | 12/2016 | Wang | H04W 4/023 |
| 2017/0063588 | A1* | 3/2017 | Sun | H04L 27/2602 |
| 2017/0127412 | A1* | 5/2017 | Amizur | H04W 56/00 |

\* cited by examiner

Primary Examiner — Natasha W Cosme

(57) ABSTRACT

The present disclosure describes methods and apparatuses for secure fine timing measurement (FTM) with encoded long training fields (LTFs). In some aspects, a device transmits an announcement frame for an FTM exchange that includes an indication of encoding. Based on the indication of encoding, an LTF of a first null data packet (NDP) of the FTM exchange is encoded. The device transmits the first NDP having the encoded LTF to another device, and receives, from the other device, a second NDP having an encoded LTF. A round-trip time for the first and second NDPs with encoded LTFs is determined. Based on this round-trip time, a distance between the device and the other device can be determined. By encoding the LTFs of the NDPs of the FTM exchange, third parties can be prevented from spoofing an FTM frame to compromise the FTM exchange and related proximity-based security.

20 Claims, 16 Drawing Sheets

METHODS AND APPARATUS FOR SECURE FINE TIMING MEASUREMENT WITH ENCODED LONG TRAINING FIELDS

CROSS REFERENCE TO RELATED APPLICATION

This present disclosure claims priority to U.S. Provisional Patent Application Ser. No. 62/518,399 filed Jun. 12, 2017, the disclosure of which is incorporated by reference herein in its entirety.

BACKGROUND

Computing and electronic devices are often capable of wirelessly communicating with other devices or network controllers through which various resources are accessible. In some wireless networks, access to network-based resources is managed based on proximity with a device to ensure that the device or user of the device is physically present or proximate when accessing the resources. Typically, proximity of the device is determined by calculating a distance to the device based on an exchange of standard data packets through the wireless network.

Portions of these standard data packets, however, are also used for other network procedures and implemented with a pre-defined format that is static and publicly known, including by malicious actors. As such, a malicious actor desiring to gain unauthorized access to proximity-managed resources can copy, replay, or spoof part of a packet exchange with an authorized device to appear closer to the network controller than the authorized device. By so doing, the malicious actor appears, to the network controller, as the authorized device within proximity, which in turn causes the network controller to grant the malicious actor access to the network-based resources. Accordingly, the use of standard data packets with pre-defined or static formats results in unsecure ranging and proximity detection procedures that are vulnerable to packet spoofing or replay attacks by malicious actors.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is implemented by a secure fine timing measurement (FTM) manager to transmit, from a first device and via a wireless medium, an announcement frame for an FTM exchange, wherein the announcement frame includes an indication of encoding for the FTM exchange. Based on the indication of encoding, the secure FTM manager encodes a long training field (LTF) of a first null data packet (NDP) of the FTM exchange. The first NDP with the encoded LTF is transmitted to a second device, and a second NDP having an encoded LTF is received from the second device. The secure FTM manager then determines a round-trip time for the first NDP having the encoded LTF and the second NDP having the encoded LTF. The round-trip time can then be used to determine a distance between the first and second device, such as to enable proximity-based features of one of the devices.

In other aspects, a System-on-Chip comprises a wireless communication controller and a secure FTM manager that is implemented at least partially in hardware. The secure FTM manager is configured to transmit, via the wireless communications controller, an announcement frame for an FTM exchange, wherein the announcement frame includes an indication of encoding for the FTM exchange. Based on the indication of encoding, an LTF of the first NDP of the FTM exchange is encoded by the secure FTM manager. The first NDP is transmitted via the wireless communications controller to a remote device. A second NDP having an encoded LTF is received from the remote device via the wireless communication controller. A round-trip time for the first NDP having the encoded LTF and the second NDP having the encoded LTF is then determined. In some cases, a distance to the remote device is determined based on the round-trip time, which can then be used to enable proximity-based features or services.

In yet other aspects, a computer-readable storage media comprises instructions that, responsive to execution by a hardware-based processor, implement a secure FTM manager. The secure FTM manager transmits, via a wireless interface of a device, an announcement frame for an FTM exchange, wherein the announcement frame includes an indication of encoding for the FTM exchange. Based on the indication of encoding, an LTF of a first NDP of the FTM exchange is encoded. The first NDP having the encoded LTF is transmitted to a remote device, and a second NDP having an encoded LTF is received from the remote device. A round-trip time for the first NDP having the encoded LTF and the second NDP having the encoded LTF is then determined by the secure FTM manager. This round-trip time is useful to determine a distance to the remote device, by which proximity with the remote device can then be detected to enable proximity-based features or services.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of secure fine timing measurement (FTM) with encoded long training fields are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
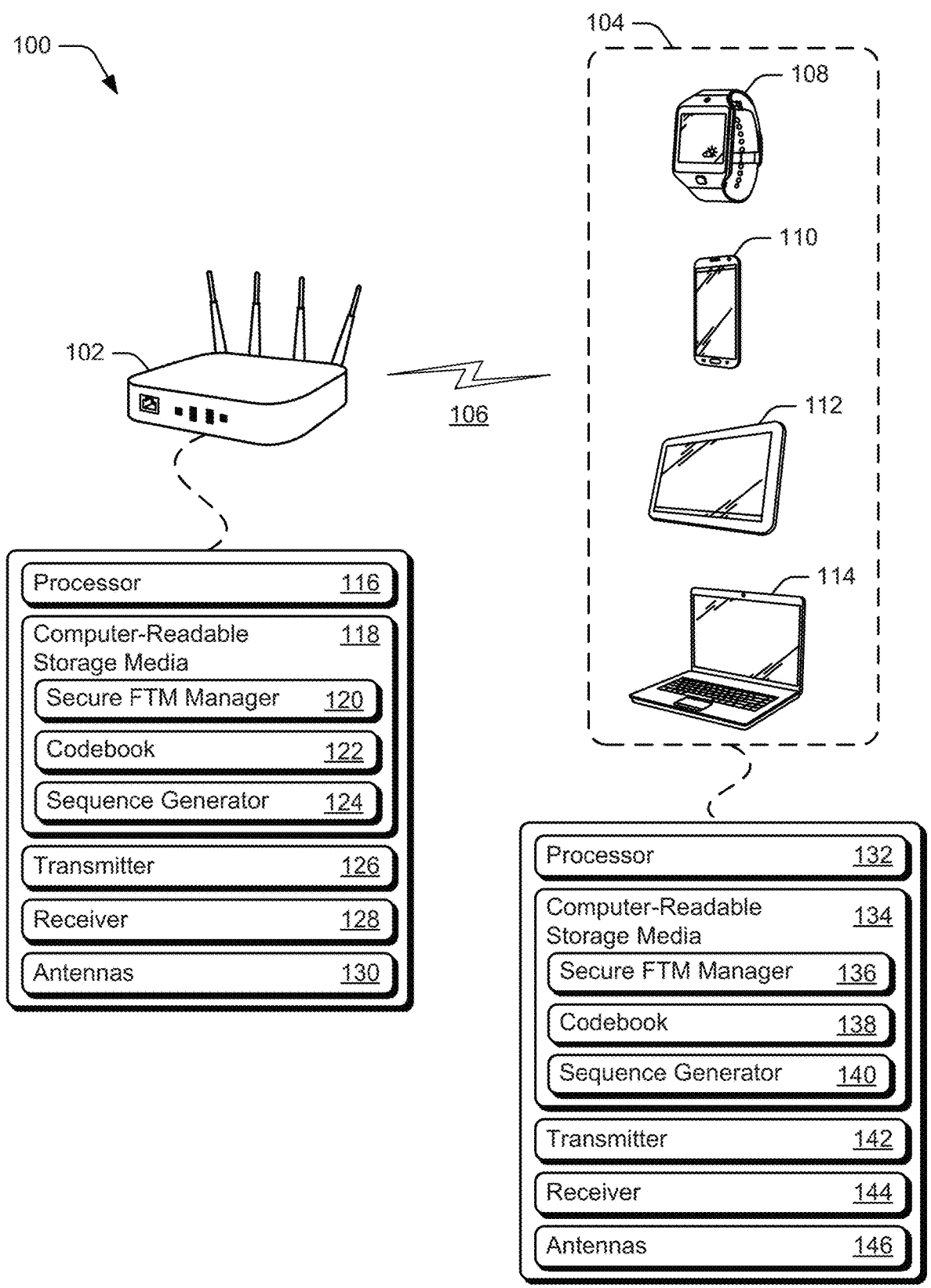
FIG. 1 illustrates an example operating environment that includes wireless devices implemented in accordance with one or more aspects.

Conventional techniques for measuring distance or determining proximity between devices of a wireless network often rely on exchanging standard data packets with a pre-defined format. Typically, proximity of a device is determined by calculating a distance to the device based on a bi-directional exchange of the standard data packets through the wireless network. Portions of these standard data packets, however, are also used for other unsecure network procedures and are publicly known, including by malicious actors (e.g., a type-B attacker). As such, a malicious actor desiring to gain access to proximity-managed resources can copy, replay, or spoof at least part of a legitimate packet exchange of an authorized device to appear closer to the network controller than the authorized device. By so doing, the malicious actor appears, to the network controller, as the authorized device in proximity, which in turn causes the network controller to incorrectly grant the malicious actor access to the network-based resources. Accordingly, the use of standard data packets with pre-defined or static formats results in unsecure proximity detection procedures that are vulnerable to packet spoofing or replay attacks by malicious actors.

This disclosure describes techniques and apparatuses for secure fine timing measurement (FTM) with encoded long training fields (LTFs). Generally, these techniques and apparatuses may use null data packets with encoded LTFs to prevent third parties or malicious actors from copying or spoofing packets of an FTM procedure. By so doing, an FTM procedure can be implemented between two devices that have knowledge of the LTF encoding, which in turn ensures security of proximity-based features or resources of one or both devices. For example, a car with proximity-based security that is configured to implement secure FTM with encoded LTFs can perform a secure FTM exchange with a key fob of the car's owner. Because an attacker cannot copy or spoof the encoded LTFs of the secure FTM exchange, the attacker is unable to alter a distance determination made by the car to fake proximity of the car's owner. This in turn prevents the attacker from unlocking the car or disabling other proximity-based security features to gain unauthorized access of the car.

In various aspects of secure FTM with encoded LTFs, an announcement frame is transmitted that includes an indication of encoding for an FTM exchange. Based on the indication of encoding, an LTF of a first NDP of the FTM exchange is encoded. The first NDP having the encoded LTF is then transmitted to a remote device, and a second NDP having an encoded LTF is received from the remote device. A round-trip time for the first NDP having the encoded LTF and the second NDP having the encoded LTF is determined, such as by a secure FTM manager. This round-trip time can then be used to determine a distance to the remote device, by which proximity with the remote device can then be detected to enable proximity-based features or services.

These and other aspects described herein may be implemented to provide secure FTM exchanges in which a third party or malicious actor is unaware of an encoding scheme used, such that packets or other FTM communications cannot be copied or spoofed. In some cases, devices of the secure FTM exchange use known or predefined codebooks to encoded LTFs of NDPs exchanged between the devices. In other cases, a polynomial is used to generate a pilot sequence of the LTFs of NDPs. Alternately or additionally, phase encoding can be applied to legacy type frames and/or acknowledgments to provide secure FTM exchanges for legacy devices or networks of mixed devices. Generally, encoding the LTFs or legacy frames improves security of distance determination and proximity detection procedures that rely on FTM operations, which in turn increases security of a wireless network and proximity-based features.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 that includes an example host device 102 and example client devices 104 in accordance with one or more aspects. Each of these devices may be wireless-network-enabled and capable of communicating data, packets, and/or frames over a wireless link 106. The wireless link 106 may include any suitable type of wireless communication link or wireless network connection. For example, the wireless link 106 may be implemented in whole or in part as a wireless local-area-network (WLAN), ad-hoc WLAN, wireless mesh network, near-field communication (NFC) link, wireless personal-area-network (WPAN), wireless wide-area-network (WWAN), or short-range wireless network. The wireless link 106 may be implemented in accordance with any suitable communication protocol or Institute of Electrical and Electronics Engineers (IEEE) standard, such as IEEE 802.11-2012, IEEE 802.11-2016, IEEE 802.11ac, IEEE 802.11ax, IEEE 802.11ax, and the like.

In this example, the host device 102 is embodied as an access point that is capable of providing and managing a wireless network that includes the wireless link 106. In other cases, the host device 102 may include or be embodied as a base station, enhanced node base station, wireless router, broadband router, modem device, drone controller, vehicle-based network device, or other network administration device. The client devices 104 of the example environment 100 include a smart-watch 108, smart-phone 110, tablet computer 112, and laptop computer 114. Although not shown, other configurations of the client devices 104 are also contemplated, such as automation equipment, key fob, medical device, security system, drone, camera, wearable smart-device, Internet-of-Things (IoT) device, gaming device, personal media device, navigation device, mobile-internet device (MID), network-attached-storage (NAS) drive, mobile gaming console, and so on.

Generally, the host device 102 provides connectivity to the Internet, other networks, or network-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). Although not shown, the host device 102 may include or manage access to proximity-based or proximity-controlled services or resources. For example, when implemented as part of a vehicle-based network, the host device 102 may control security or operative functionalities of a vehicle based on proximity with a client device 104 associated with a user or driver of the vehicle. Generally, while associated with the host device 102 via the wireless link 106, the smart-watch 108, smart-phone 110, tablet computer 112, or laptop computer 114 may access the Internet or other networks for which host device 102 acts as a gateway.

The host device 102 includes a processor 116 configured to execute processor-executable instructions and computer-readable storage media 118 (CRM 118). In some cases, the processor 116 is implemented as an application processor (e.g., multicore processor) or baseband processor to manage operation and connectivity of the host device 102. Alternately or additionally, the processor 116 can be implemented as a processor core, microcontroller, or digital signal processor (DSP). The CRM 118 of the host device 102 may include any suitable type and/or combination of storage media, such as read-only memory (ROM), random access memory (RAM), or Flash memory. In the context of the disclosure, the CRM 118 of the host device 102 is implemented as storage media, and thus does not include transitory signals or carrier waves. The CRM 118 may store firmware, an operating system, or applications of the host device 102 as instructions that are executed by the processor 116 to implement various functionalities of the host device 102. In this example, a secure fine timing measurement manager 120 (secure FTM manager 120), codebook 122, and sequence generator 124 are embodied on the CRM 118 of the host device 102.

The secure FTM manager 120 of the host device 102 can be implemented to perform various functions associated with time measurement, such as FTM frame generation, encoding long training fields (LTFs), pilot sequence generation, time of arrival calculations, and so on. For example, the secure FTM manager 120 may encode LTFs of null data packets (NDPs) or FTM frames of an FTM exchange of packets or frames. In some cases, the secure FTM manager 120 inserts, sets, or configures a field of an NDP announcement frame or trigger frame to provide an indication of encoding for an FTM exchange or operation with other devices. In such cases, the secure FTM manager 120 may transmit the indication of encoding in the clear (e.g., plain text) or as an encoded information field for decryption by intended receivers. The implementations and uses of a secure FTM manager 120 vary and are described throughout the disclosure.

In this example, the CRM 118 of the host device 102 also includes a codebook 122 and a sequence generator 124 for encoding (or decoding) LTFs of data packets or frames exchanged as part of an FTM operation. Generally, the secure FTM manager 120 encodes an LTF of a data packet or frame to prevent a third party or malicious actor from spoofing or responding to an FTM communication. The codebook 122 may include a predefined or known set of pilot sequences that are useful to encode or decode LTFs, such as when implementing secure FTM exchanges. In some cases, the pilot sequences are indexed to enable two or more devices to agree or negotiate on which pilot sequences to use for a secure FTM exchange. Alternately or additionally, the sequence generator 124 can be used to generate a pilot sequence to use for LTF encoding or decoding during a secure FTM exchange. The sequence generator 124 can be implemented as any suitable polynomial or other deterministic generator such that a pilot sequence can be derived by the secure FTM manager 120 based on a starting state or seed value.

Although not shown, the host device 102 may also include a time domain processing block and/or a frequency domain processing block for processing FTM data packets and frames. The time domain processing block may include any suitable combination of hardware, processors, or software modules configured to implement time domain processing and associated functions, such as Fourier transforms and complex filtering. The frequency domain processing block may include any suitable combination of hardware, processors, or software modules configured to implement frequency domain processing and associated functions, such as phase and frequency-based power calculations. Generally, the secure FTM manager 120 is able to access or control the time domain processing block or the frequency domain processing block to implement respective time domain or frequency domain functionalities.

The host device 102 also includes a transmitter 126, receiver 128, and antennas 130 for providing a wireless network, communicating with the client devices 104, or communicating other wirelessly-enabled devices. The transmitter 126 or receiver 128 may include any suitable number of respective communication paths (e.g., transmit or receive chains) to support transmission or reception of multiple spatial streams of data. Functionalities of the transmitter 126 and/or receiver 128 may be managed or accessible through a communications controller or baseband processor, which may be implemented with or separately from a secure FTM manager 120. Although not shown, radio frequency (RF) front-end circuitry of the host device 102 can couple or connect the transmitter 126 or receiver 128 to the antennas 130 to facilitate various types of wireless communication. The antennas 130 of the host device 102 may include an array of multiple antennas that are configured similar to or differently from each other.

Each of client devices 104 includes a processor 132 and computer-readable storage media 134 (CRM 134). The processor 132 can be any suitable type of processor, either single-core or multi-core, for executing instructions or code associated with applications, firmware, or an operating system of the client device 104. The CRM 134 may include any type and/or combination of suitable storage media, such as RAM, non-volatile RAM (NVRAM), ROM, or Flash memory useful to store data of applications and/or an operating system of the client device 104. In the context of the disclosure, the CRM 134 is implemented as storage media, and thus does not include transitory signals or carrier waves. In this example, another secure fine timing measurement manager 136 (secure FTM manager 136), codebook 138, and sequence generator 140 are embodied on the CRM 134 of the client device 104.

The secure FTM manager 136 of the client device 104 may be implemented similar to or differently from the secure FTM manager 120 of the host device 102, and can perform various functions associated with time measurement, such as LTF decoding, pilot sequence generation, FTM NDP exchanges, or time of arrival calculations. For example, the secure FTM manager 136 may encode LTFs of null data packets (NDPs) or FTM frames of an FTM exchange of packets or frames. In some cases, the secure FTM manager 136 reads or accesses a field of an NDP announcement frame or trigger frame to obtain an indication of encoding for an FTM exchange or operation with other devices. The implementations and uses of the secure FTM manager 136 vary, and are described throughout the disclosure.

In this example, the CRM 134 of the client device 104 also includes a codebook 138 and a sequence generator 140 for encoding (or decoding) LTFs of data packets or frames exchanged as part of an FTM operation. Generally, the secure FTM manager 136 encodes an LTF of a data packet or frame to prevent a third party or malicious actor from spoofing or responding to an FTM communication. The codebook 138 may include a predefined or known set of pilot sequences that are useful to encode or decode LTFs, such as when implementing secure FTM exchanges. In some cases, the pilot sequences of the codebooks 122 and 138 are similarly indexed to enable two or more devices to agree or negotiate on which pilot sequences to use for a secure FTM exchange. Alternately or additionally, the sequence generator 140 can be used to generate a pilot sequence to use for LTF encoding or decoding during a secure FTM exchange. The sequence generator 140 can be implemented as any suitable polynomial or other deterministic generator such that a pilot sequence can be derived by the secure FTM manager 136 based on a starting state or seed value.

Although not shown, the client device 104 may also include a time domain processing block and/or a frequency domain processing block for processing FTM data packets and frames. The time domain processing block may include any suitable combination of hardware, processors, or software modules configured to implement time domain processing and associated functions, such as Fourier transforms and complex filtering. The frequency domain processing block may include any suitable combination of hardware, processors, or software modules configured to implement frequency domain processing and associated functions, such as phase and frequency-based power calculations. Generally, the secure FTM manager 136 is able to access or control the time domain processing block or the frequency domain processing block to implement respective time domain or frequency domain functionalities.

Each of the client devices 104 also includes a transmitter 142, receiver 144, and antennas 146 for communicating with the host device 102 or other wirelessly-enabled devices. Although shown as separate entities, the transmitter 142 and receiver 144 may be implemented in combination as a transceiver component that supports both transmit and receive functionalities. The transmitter 142 or receiver 144 may include any suitable number of respective communication paths (e.g., transmit or receive chains) to support transmission or reception of multiple spatial streams of data. Functionalities of the transmitter 142 and/or receiver 144 may be managed or accessible through a communications controller or baseband processor, which may be implemented with or separately from a secure FTM manager 136. Front-end circuitry (not shown) of the client device 104 may couple or connect the transmitter 142 or receiver 144 to the antennas 146 to facilitate various types of wireless communication. The antennas 146 may include an array of multiple antennas that are configured similar to or differently from each other.

Figure 2:
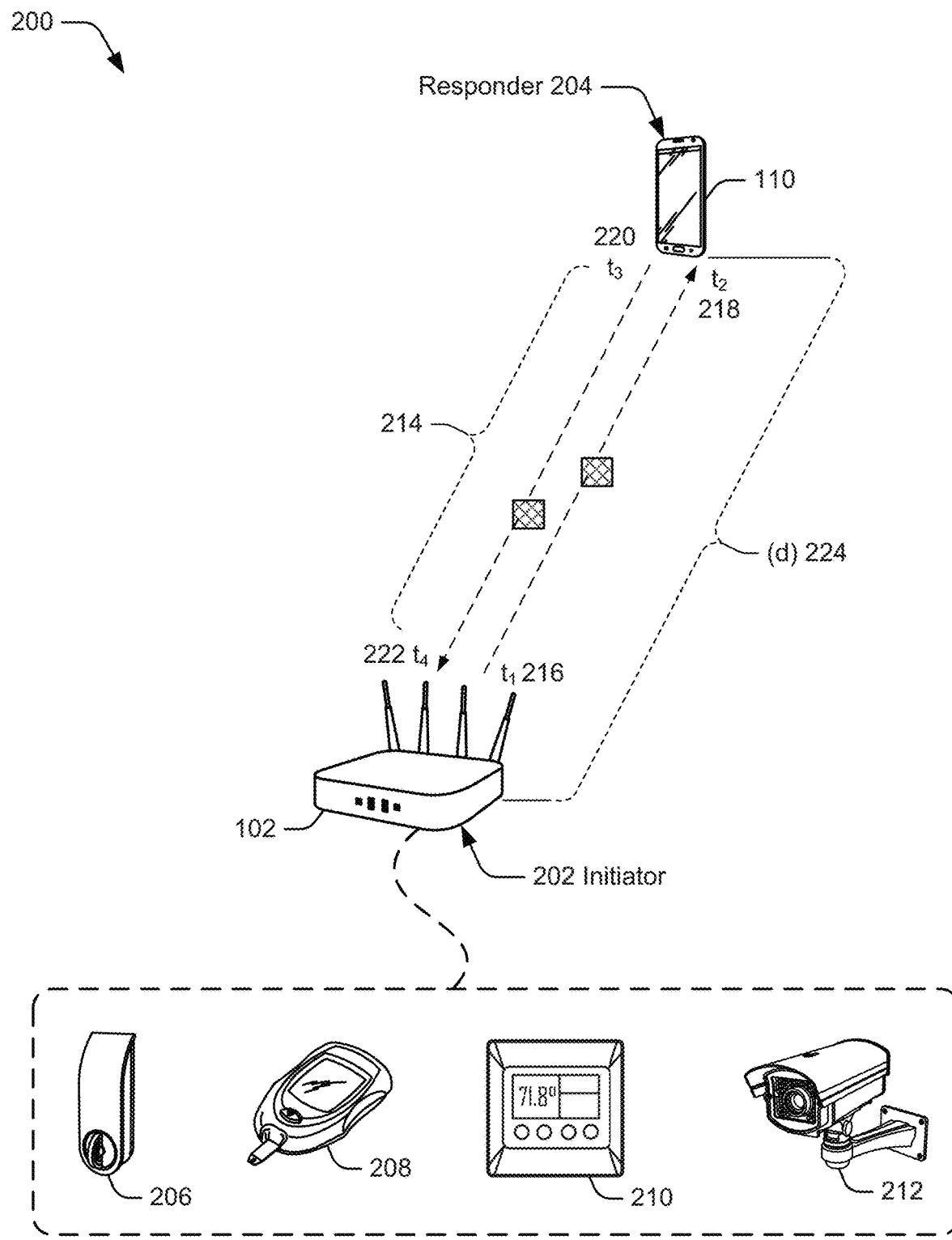
FIG. 2 illustrates an example wireless network in which devices of FIG. 1 may communicate as an FTM initiator or an FTM responder.

FIG. 2 illustrates an example wireless network 200 in which devices of the example environment 100 are configured or acting as an FTM initiator (initiator 202) and an FTM responder 204 (FTM responder) in accordance with one or more aspects. In the context of this example, a host device 102 (e.g., an access point) is configured as the initiator 202 of a secure FTM exchange with the responder 204, which is shown as a smart-phone 110. In some aspects, the initiator 202 or responder 204 may manage access to or be implemented as a device that provides functionalities, features, or services based on distance or proximity. As shown in FIG. 2 and by way of example, the initiator 202 may manage access to or be implemented as a device that provides a feature or service based on proximity. These example devices include a door lock 206, medical device 208, smart thermostat 210, and security system 212, which may be also be implemented as a responder 204 of an exchange of FTM packets or frames.

Generally, the initiator 202 and responder 204 of an FTM operation or procedure exchange beacons, data packets, or data frames over a wireless link to synchronize timing with, or measure round-trip time (RTT) between, one another. In the context of FIG. 2, an FTM exchange 214, or secure FTM exchange, includes a bi-directional exchange of data packets or FTM frames with known timing such that the initiator 202 or responder 204 can determine the round-trip time of at least two of the data packets or FTM frames of the FTM exchange 214. The known timing or timing information may include a time of departure (ToD) or transmission time of a data packet or frame by one device, and a time of arrival (ToA) or reception time of the data packet or frame at another device.

With reference to the FTM exchange 214, examples of these times are shown as a time of departure $t_1$ 216 for a first data packet, a time of arrival $t_2$ 218 of the first data packet, a time of departure $t_3$ 220 for a second data packet, and a time of arrival $t_4$ of the second data packet. With these times associated with an FTM exchange, one of the secure FTM managers can determine a round-trip time (RTT) for the exchange as shown in equation 1.

$$RTT=(t_4-t_1)-(t_3-t_2) \qquad \text{Equation 1: Round-Trip Time Calculation}$$

In this example, the FTM exchange 214 between the initiator 202 and responder 204 may comprise any suitable data packets or frames, such as null data packets, FTM frames, or acknowledgments (ACKs). Alternately or additionally, multiple RTTs may be measured, compiled, or averaged from additional FTM exchanges. From one or more RTTs, the secure FTM manager 120 or 136 may determine a distance to another device or proximity with another device, such as to determine whether to provide features or services based on proximity of the device. For example, the secure FTM manager 120 may calculate a time-of-flight (ToF) for one frame communicated between the initiator 202 and responder 204 as one half of the RTT, which includes travel time of a round-trip of the data packets or frames of the FTM exchange 214. With one half of RTT and using the speed of light (c) as a velocity at which the frames travel between the initiator 202 and responder 204, the distance (d) 224 is calculated as shown by equation 2.

Distance based on RTT $$d = c \times \frac{RTT}{2}$$ Equation 2

Further, the determined distance can be used in combination with knowledge of locations of devices of a wireless network to enable a position of other network devices to be precisely determined through trilateration. In some cases, the secure FTM manager 120 can implement locating services capable of determining its position or a position another device of the network with approximately sub-meter precision.

In some aspects of secure FTM with encoded LTFs, an FTM exchange includes communication of null data packets (NDPs) between devices respectively configured as an initiator and a responder. By way of example, consider FIG. 3 which illustrates a timeline 300 of an example FTM exchange performed with NDPs having encoded LTFs. In this example, a host device 102 (e.g., access point) is configured or acts as an initiator 302, and a client device 110 (e.g., smart-phone) is configured or acts as a responder 304 of the secure FTM exchange. Generally, the initiator 302 transmits an NDP announcement frame 306 (NDP-A 306) that announces or informs the responder 304 of the FTM exchange. In some cases, the NDP-A 306 includes an indication of encoding that will be used to encode one or more NDPs of the FTM exchange, such as single-user null data packets (SU NDPs).

Figure 3:
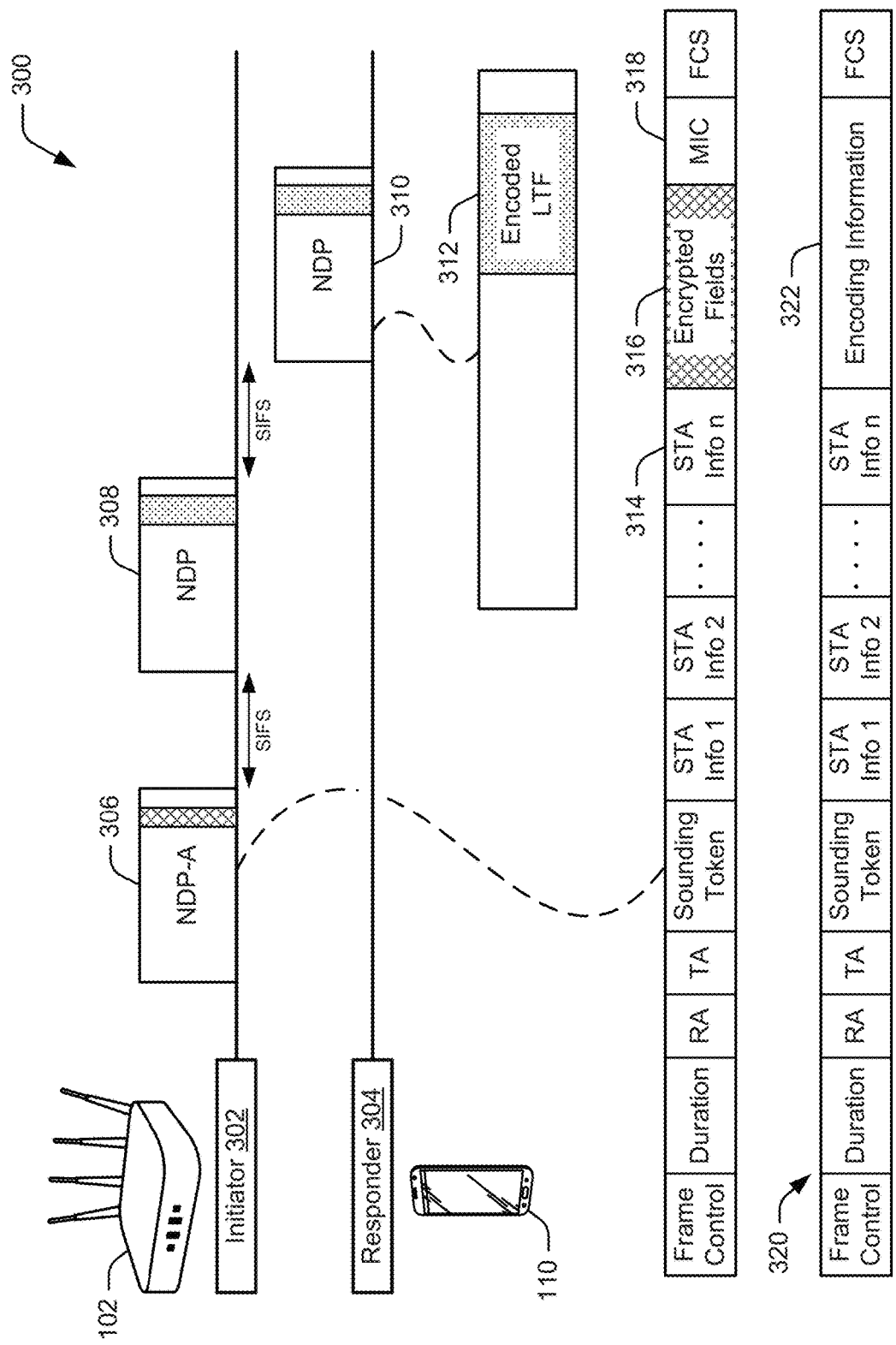
FIG. 3 illustrates an example exchange of null data packets (NDPs) with encoded long training fields (LTFs).

As shown in FIG. 3 and after transmission of the NDP-A 306, the initiator 302 transmits an NDP 308 with an encoded LTF, and the responder 304 transmits an NDP 310 with an encoded LTF, an example of which is shown at 312. In some cases, communications of this or other FTM exchanges described herein are delayed by, performed after, or scheduled based on a short interframe space (SIFS) interval. The encoded LTF 312, or an encoded portion of an NDP, may include a Very High Throughput LTF (VHT-LTF) or High Efficiency LTF (HE-LTF). Alternately or additionally, the NDP with the encoded LTF may be configured with any suitable bandwidth, such as 20 MHz, 40 MHz, 80 MHz, or 160 MHz. Throughout the FTM exchange, NDPs or frames may be communicated using a same antenna of the initiator 302 and a same antenna of the responder 304 such that consistency of a wireless channel or distance between the devices can be better maintained during the exchange.

The NDP-A 306 transmitted by the initiator 302 includes an indication of the encoding for the NDP 308 and/or NDP 310 of the FTM exchange. The indication of encoding may be conveyed via any suitable identifier or bit value, such as an indication of a codebook, a codebook index, a pilot sequence index (e.g., initial state), a polynomial selection, a key value, a seed value, or a combination thereof. In some cases, the indication of encoding is used in combination with a token or sequence that is transmitted as an unprotected part of an FTM frame or NDP-A to generate a pilot sequence for encoding the LTF of the NDP. Generally, the indication of encoding informs the responder 304 of an LTF encoding of the NDP 308 and an encoding to use for the LTF of the NDP 310 when replying to the initiator 302. The NDP-A 306 can be transmitted with media access control (MAC) level encryption (e.g., protected management frame) or without MAC level encryption. Because third parties or malicious actors are unable to interpret or otherwise use the indication of the encoding, the LTF encoding of the subsequent NDPs will be unknown to them, thereby preventing spoof or replay attacks of the FTM exchange.

The encoded LTF 312 may be encoded using any suitable modulation technique, such as binary phase shift keying (BPSK), quadrature phase shift keying (QPSK), or the like. For example, a pilot sequence for encoding an NDP LTF may include a BPSK or QPSK modulated pilot sequence that is generated based on a respective codebook 122, 138 or sequence generator 124, 140 (e.g., polynomial sequence generator). Generally, the initiator 302 and responder 304 can use the codebook or sequence generator based on the indication of encoding that is included with the NDP-A 306 (or otherwise negotiated beforehand) to provide different pilot sequences for NDPs of the FTM exchange.

As noted, the indication of the encoding can be sent unencrypted (e.g., plain text) or encrypted within part of the NDP-A 306. By way of example, FIG. 3 includes a detailed example of the NDP-A 306 that shows various information fields. In addition to typical NDP-A fields, such as frame control, duration, receiver address (RA), transmitter address (TA), a sounding token, station information fields, and a frame check sequence (FCS), the NDP-A 306 may also include a modified station information field 314 (STA Info field 314), encrypted fields 316 (e.g., approximately 4 bytes of encrypted information), and a message integrity check 318 (MIC 318).

The modified STA Info field 314 may include a bit that is defined to indicate the field as a last STA info field and that a following or subsequent field of the NDP-A is encrypted (e.g., encrypted fields 316). An indication of encoding for the LTFs of the FTM exchange can be stored in the encrypted fields 316 to protect the FTM exchange from third parties or malicious actors. The MIC 318 can be used by the responder 304 when decrypting the encrypted fields 316 to verify the decrypted contents or information, such as the indication of encoding for the FTM exchange. Accordingly, the FTM exchange of NDPs with encoded LTFs can be initiated or setup with encrypted NDP-A fields to provide secure ranging operations. Alternately or additionally, the indication of encoding, or a portion of the indication, can be exchanged separate from an NDP-A, such as by transmitting a separate encrypted message to a responder or initiator.

In some aspects, an indication of encoding or a portion of the indication of encoding is transmitted unencoded (e.g., as plaintext). By way of example, consider NDP-A 320 of FIG. 3, which may be configured similar to the NDP-A 306 as described with respect to the various information fields. The NDP-A 320 includes an unencrypted indication of encoding for a secure FTM exchange, which is shown generally as encoding information 322. In some cases, the encoding information 322 includes plaintext information that is useful to determine the encoding of LTFs of the secure FTM exchange. In such cases, the encoding information 322 may be used in combination with other information previously exchanged over a secure channel to determine the LTF encoding. By so doing, secure FTM operations can be implemented without a delay associated with decrypting the encrypted fields of the NDP-A in order to determine the LTF encoding. Once the FTM operations are complete, an initiator 302 or responder 304 can transmit a location measurement report (LMR, not shown) with respective times of arrival and departure of NDPs of the FTM exchange to enable another initiator 302 or responder 304 to implement ranging operations.

Figure 4:
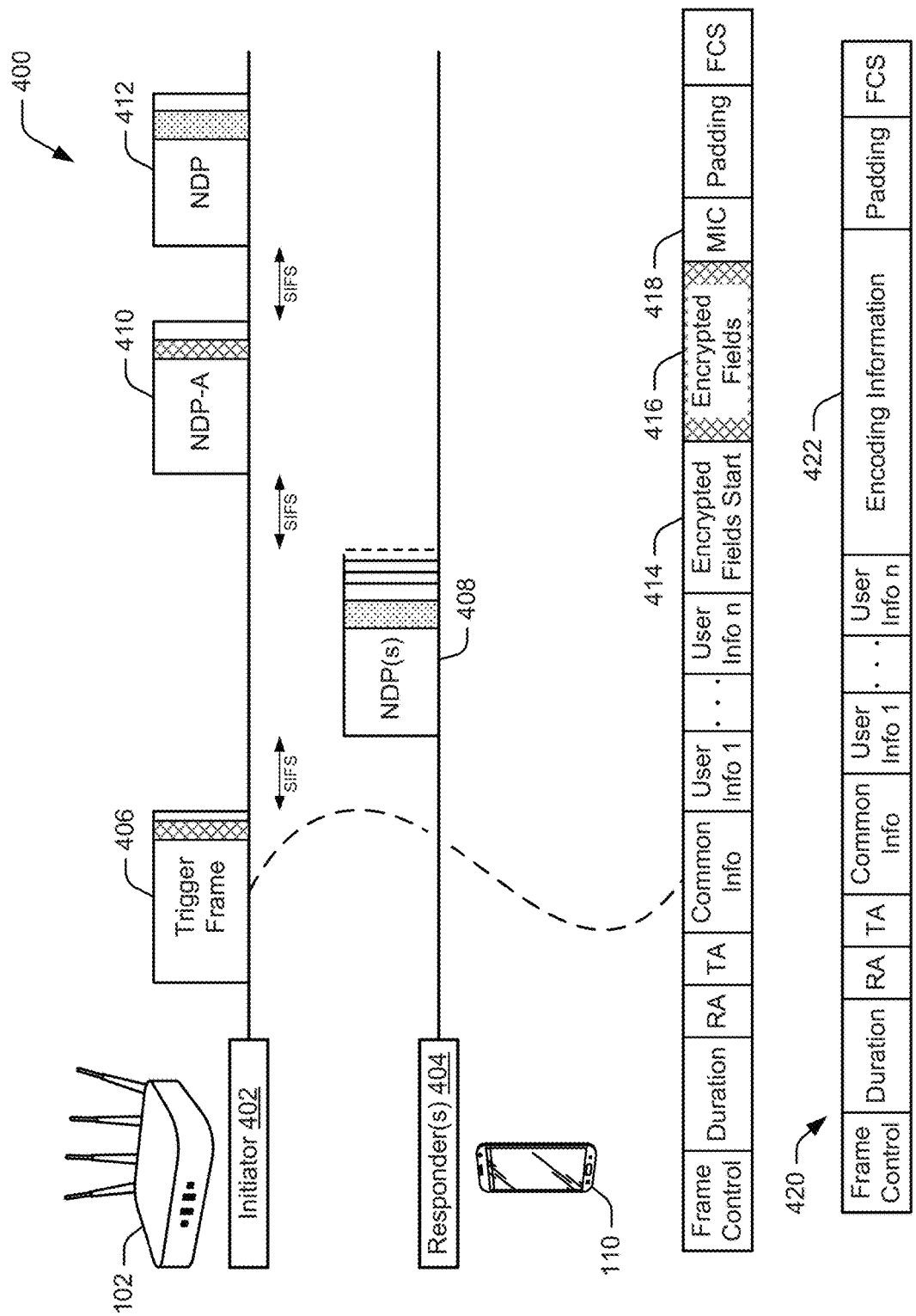
FIG. 4 illustrates an example exchange of multi-user frames and NDPs with encoded LTFs capable of supporting multi-user ranging operations.

FIG. 4 illustrates a timeline 400 of an example FTM exchange of multi-user frames and NDPs with encoded LTFs capable. In at least some cases, the use of multi-user frames and NDPs supports secure ranging operations between an initiator 402 and multiple responders 404. In this example, a host device 102 (e.g., access point) is configured or acts as an initiator 402, and a client device 110 (e.g., smart-phone) represents at least one responder 404 participating in the FTM exchange. Generally, the initiator 402 transmits a trigger frame 406 that informs the responders 404 of the FTM exchange and requests one or more of the responders to transmit a respective NDP. In some cases, the trigger frame 406 includes an indication of encoding that will be used to encode one or more NDPs of the FTM exchange, such as multi-user null data packets (MU NDPs) or NDPs transmitted by the responders 404.

As shown in FIG. 4 and after transmission of the trigger frame 406, the responders 404 reply with respective NDPs 408 that include an LTF encoded. These NDPs 408 may be configured similarly to the NDPs 308 or 310 as shown in FIG. 3 with an encoded LTF. After one or more NDPs 408 are received from the responders 404, the initiator 402 transmits an NDP-A 410 to the responders 404 as part of the FTM exchange. The NDP-A 410 transmitted by the initiator 402 may also include an indication of encoding to be used for subsequent NDPs of the FTM exchange. These NDPs may be configured similar to or differently from the NDP-A 306 as described with reference to FIG. 3. Following transmission of the NDP-A, the initiator 402 transmits an NDP 412 with an encoded LTF to one of the responders 404 to perform a ranging operation with that responder 404. Although not shown, the initiator 402 may transmit additional NDPs with encoded LTFs to others of the responders 404 to continue respective ranging operations with those other responders 404.

With respect to the timeline 400, the communications of this or other FTM exchanges described herein can be delayed by, performed after, or scheduled based on a short interframe space (SIFS) interval. The encoded LTFs of the NDPs 408 or the encoded LTF of the NDP 410 may include a Very High Throughput LTF (VHT-LTF) or High Efficiency LTF (HE-LTF) of the NDPs. Alternately or additionally, the NDPs having encoded LTFs may be configured with any suitable bandwidth, such as 20 MHz, 40 MHz, 80 MHz, or 160 MHz. Throughout the FTM exchange, NDPs or frames may be communicated using a same antenna of the initiator 402 and a same antenna of the responder 404 such that consistency of a wireless channel or distance between the devices can be better maintained during the exchange.

The trigger frame 406 transmitted by the initiator 402 includes an indication of the encoding for the NDPs 408 and/or NDP 412 of the FTM exchange. Alternately or additionally, the NDP-A 410 transmitted by the initiator 402 may include an indication of the encoding for the NDP 412 of the FTM exchange. The indication of encoding in the trigger frame 406 or NDP-A 410 may be conveyed via any suitable of identifier or information, such as an indication of a codebook, a codebook index, a pilot sequence index, a polynomial selection, a polynomial starting state, a key value, a seed value, or a combination thereof. In some cases, the indication of encoding is used in combination with a token or sequence that is transmitted as an unprotected part (e.g., plain text) of a trigger frame or NDP-A to generate a pilot sequence for encoding an LTF of a NDP.

Generally, the indications of encoding inform the responder 404 of an LTF encoding to use for the NDP 408 when responding to the initiator 402 and an encoding that will be used for the LTF of the NDP 412. The trigger frame 406 or the NDP-A 410 can be transmitted with MAC level encryption (e.g., protected management frame) or without MAC level encryption. Because third parties or malicious actors are unable to interpret or otherwise use the indication of the encoding, the LTF encoding of the subsequent NDPs 408 and 412 will be unknown to them, thereby preventing spoof or replay attacks of the FTM exchange.

The encoded LTFs of the NDPs 408 and 412 can be encoded using any suitable modulation technique, such as BPSK, QPSK, or another negotiated type of modulation. For example, a pilot sequence for encoding an NDP LTF may include a BPSK or QPSK modulated pilot sequence that is generated based on a respective codebook 122, 138 or sequence generator 124, 140. In various aspects of secure FTM, the initiator 402 and responder 404 can use respective codebooks or sequence generators based on the indication of encoding that is included with the trigger frame 406 and NDP-A 410 (or otherwise negotiated beforehand) to provide different pilot sequences for NDPs 408 and 412 of the FTM exchange.

With respect to the indication of the encoding, the indication can be sent as unencrypted information (e.g., plain text) or encrypted within part of the trigger frame 406 or NDP-A 410. An NDP-A 410 can be implemented similar to or differently from the NDP-A 306 as described with reference to FIG. 3, such as to include an encrypted field by which the indication of encoding is communicated to the responders 404. In accordance with one or more aspects, FIG. 4 includes a detailed example of a trigger frame 406 implemented with encrypted fields useful to communicate the indication of encoding. In addition to typical trigger frame fields, such as frame control, duration, RA, TA, common information (common info), user information (user info), padding and FCS, the trigger frame 406 may also include an encrypted fields start field 412, encrypted fields 416, and a MIC 418. The encrypted fields start field may include a bit or specific association identification (e.g., AID 2045) set to an encrypted field start indication. An indication of encoding for the LTFs of the FTM exchange can be stored in the encrypted fields 416 to protect the FTM exchange from third parties or malicious actors. In some cases, the MIC 418 is used by a responder 404 when decrypting the encrypted fields 416 to verify the decrypted contents or information, such as the indication of encoding for the NDPs 408. Alternately or additionally, the encrypted fields and MIC of an NDP-A or trigger frame can be indicated by using reserved fields in a MAC header of a control frame. Accordingly, the FTM exchange of NDPs with encoded LTFs can be initiated or setup with encrypted fields of a trigger frame or NDP announcement to provide secure ranging operations. Alternately or additionally, the indication of encoding, or a portion of the indication, can be exchanged separate from a trigger frame, such as by transmitting a separate encrypted message to a responder or initiator.

In some aspects, an indication of encoding or a portion of the indication of encoding is transmitted unencoded (e.g., plaintext). By way of example, consider trigger frame 420 of FIG. 4, which may be configured similar to the trigger frame 406 as described with respect to the various information fields. The trigger frame 420 includes an unencrypted indication of encoding for a secure FTM exchange, which is shown generally as encoding information 422. In some cases, the encoding information 422 includes plaintext information that is useful to determine the encoding of LTFs of the secure FTM exchange. In such cases, the encoding information 422 may be used in combination with other information previously exchanged over a secure channel to determine the LTF encoding. By so doing, secure FTM operations can be implemented without a delay associated with decrypting the encrypted fields of the trigger frame in order to determine the LTF encoding. Once the FTM operations are complete, an initiator 402 or responder 404 can transmit an LMR (not shown) with respective times of arrival and departure of NDPs of the FTM exchange to enable another initiator 402 or responder 404 to implement ranging operations.

Figure 5:
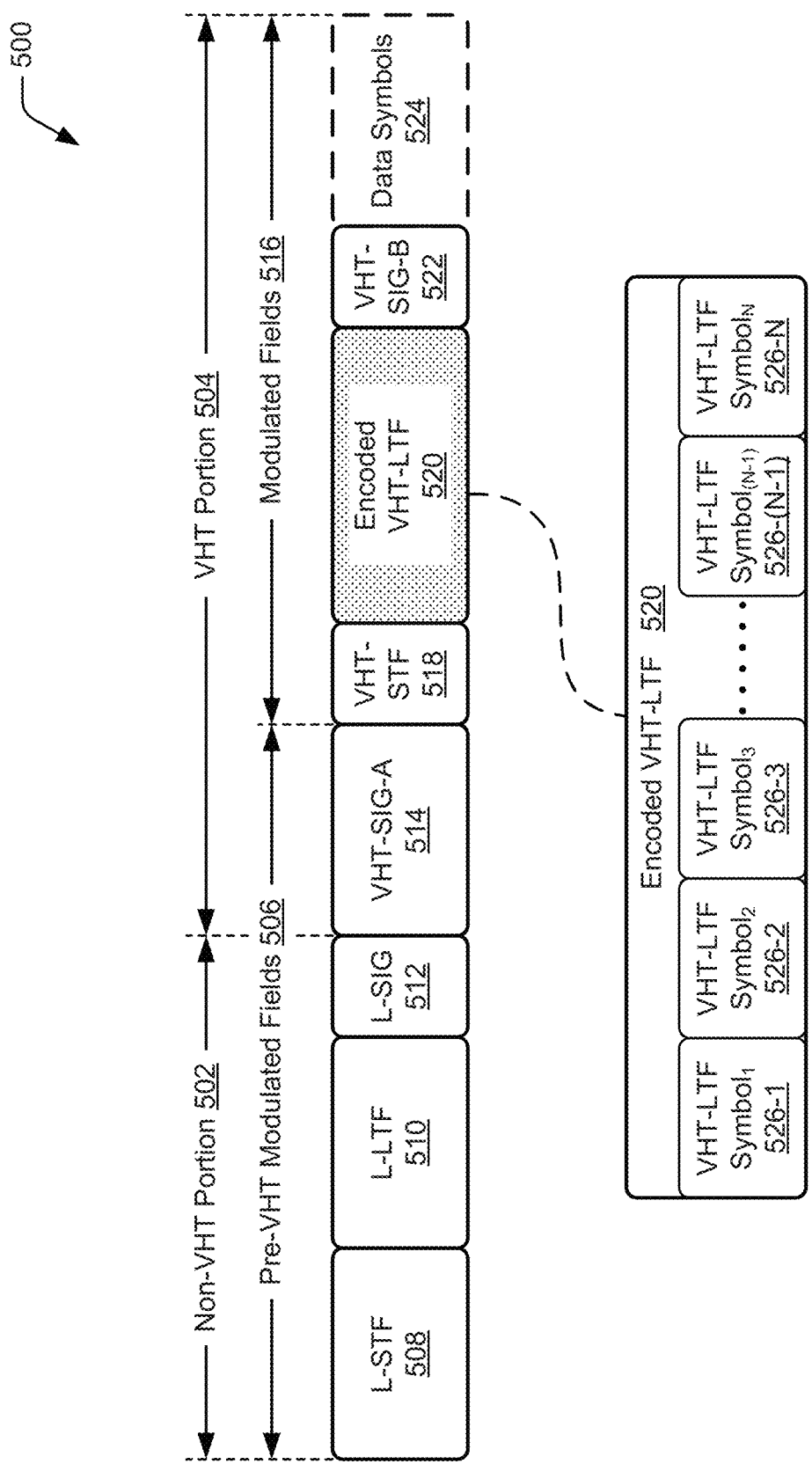
FIG. 5 illustrates an example NDP frame with an encoded LTF in accordance with one or more aspects.

FIG. 5 illustrates an example NDP frame 500 with an encoded LTF in accordance with one or more aspects. Although shown with an encoded LTF, the NDP frame 500 or other NPD frames described may be implemented with one or more LTF symbols that are not encoded. In other words, some or all LTF symbols of an LTF can be encoded to implement various aspects of encoded LTFs for secure FTM exchanges. In this example, the NDP frame 500 having an encoded LTF includes a non-VHT portion 502 and a VHT portion 504 of the NDP frame.

The non-VHT portion 502 comprises pre-VHT modulated fields 506, such as a legacy short training field 508 (L-STF 508), legacy long training field 510 (L-LTF), legacy signal field 512 (L-SIG 512), and VHT signal field A 514 (VHT-SIG-A 514). The VHT portion 504 of the NDP frame 500 includes VHT modulated fields 516, such as a VHT short training field 518 (VHT-STF 518), encoded VHT long training field 520 (VHT-LTF 520), and VHT signal field B 522 (VHT-SIG-B 522). For illustrative purposes, FIG. 5 also shows where data symbols 524 are appended to the VHT fields when implementing a data-bearing frame, though the NDP frame 500 does not include a MAC-layer data body.

With reference to the encoded VHT-LTF of the NDP frame 500, the LTF field may include any suitable number of LTF symbols, which are illustrated as VHT-LTF symbol 526-1 through VHT-LTF symbol 526-N. For example, an encoded LTF of an NDP frame can include eight LTF symbols with each LTF symbol corresponding to a transmit antenna of a device. In such cases, each of the eight LTF symbols may have its own encoded pilot sequence. This is but one example of an encoded VHT-LTF with multiple LTF symbols, other implementations may include one or more LTF symbols that are encoded based on an encoding scheme determined or indicated by a device participating in a secure FTM exchange.

Figure 6:
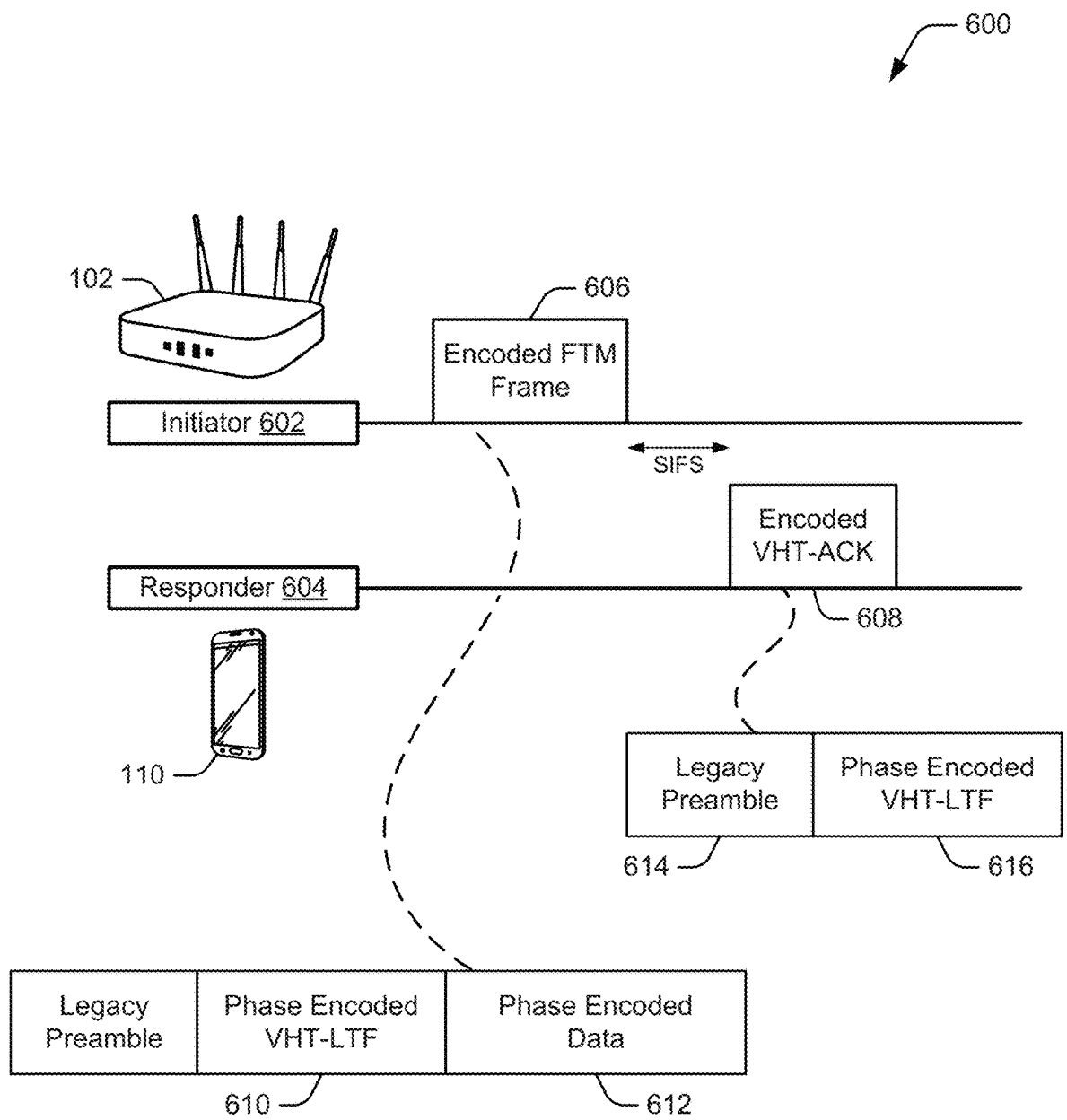
FIG. 6 illustrates an example exchange of an encoded FTM frame and acknowledgment in accordance with one or more aspects.

FIG. 6 illustrates an example exchange of an encoded FTM frame and acknowledgment at 600 in accordance with one or more aspects. In this example, a host device 102 (e.g., access point) is configured or acts as an initiator 602 of the FTM exchange, and a client device 110 (e.g., smart-phone) is configured or acts as a responder 604 of the FTM exchange. Generally, the FTM frame and/or acknowledgment are encoded using phase instead of an encoded LTF pilot sequence as described with reference to NDPs with encoded LTFs. By so doing, the phase encoding of the FTM frame and acknowledgment is effectively transparent for MAC header and physical layer data unit decoding. Although described separately, LTF pilot sequence encoding and phase-based encoding of LTF and data may be combined, such as to encode or secure both a legacy and VHT portions of a frame or data packet communicated as part of a secure FTM exchange. Alternately or additionally, the FTM frame or VHT-ACK can be configured with any suitable bandwidth, such as 20 MHz, 40 MHz, 80 MHz, or 160 MHz.

As shown in FIG. 6, the FTM exchange 600 includes an encoded FTM frame 606 that is transmitted by the initiator 602. Note that the encoded FTM frame 606 can be transmitted unannounced and without prior transmission of an indication of the encoding. The responder 604 then transmits an encoded VHT acknowledgment 608 (VHT-ACK) or another encoded FTM frame (not shown) to the initiator 602 to complete at least a portion of the FTM exchange. The communications of this or other FTM exchanges described herein can be delayed by, performed after, or scheduled based on a short interframe space (SIFS) interval. The encoded FTM frame 606 includes an LTF and data portion (e.g., rest of a packet or payload) to which phase-based encoding is applied. As shown in FIG. 6, the example encoded FTM frame 606 includes a legacy preamble, phase encoded VHT-LTF 610, and phase encoded data 612. The phase-based encoding may include a linear phase or arbitrary phase (e.g., discontinuous phase) that is applied to an FTM frame to provide the encoded FTM frame 606.

The encoded VHT-ACK 608 of the FTM exchange includes a legacy preamble 614 and a phase encoded VHT-LTF 616. Similar to the encoded FTM frame 606, a linear phase or arbitrary phase may be applied to a VHT-LTF of an ACK to provide the phase encoded VHT-LTF 616. In some cases, the linear phase is applied to the encoded FTM frame 606 or encoded VHT-ACK effective to shift a time of arrival calculation by approximately 50 to 100 nanoseconds. Time of arrival processing can be implemented without knowledge of the linear phase, which results in a time offset that can be accounted for by the initiator 602. By so doing, a third party or malicious actor would not be able to accurately spoof or replay an FTM frame or ACK without an apparent error of approximately 50 to 100 feet in a ranging operation. In some cases, the time offset is incorporated or accounted for in respective time of departure (ToA) time stamps associated with the encoded FTM frame 606 or the encoded VHT-ACK. Alternately or additionally, FTM with linear phase encoding can be implemented transparently to a responder 604 and accounted for by the initiator 602 (e.g., remove time offset) to provide ranging operations with phase encoded FTM frames.

In some aspects, an arbitrary phase is applied to an FTM frame or VHT-ACK to provide the encoded FTM frame 606 or the encoded VHT-ACK 608. The application of the arbitrary phase or discontinuous phase can be effective to make a perceived channel appear scrambled or distorted to prevent a third party or malicious actor from spoofing an FTM frame or ACK of the FTM exchange. In some cases, the arbitrary phase is generated or applied to the FTM frame or VHT-ACK with beamforming hardware, although the encoded FTM frame 606 or VHT-ACK 608 can be transmitted via one antenna. To enable decoding, a transmitting device can include an indication of the phase encoding sequence in a MAC protocol data unit (MPDU). Further, for time of arrival processing, a receiver may store LTF raw data until the MPDU is decoded and the phase encoding sequence determined. Alternately or additionally, the responder 604 may use the determined phase encoding sequence to apply arbitrary phase encoding to the VHT-LTF of the encoded VHT-ACK 608 that is transmitted to the initiator 602 to complete the FTM exchange.

Techniques of Secure Fine Time Measurement with Encoded LTFs

The following discussion describes techniques of secure fine timing measurement (FTM) with encoded long training fields (LTFs) and/or encoded FTM frames. These techniques can be implemented using any of the environments and entities described herein, such as a secure FTM manager 120, codebook 122, and/or sequence generator 124 of a host device. Alternately or additionally, the techniques can be implemented by or in combination with a secure FTM manager 136, codebook 138, and/or sequence generator 140 of a client device. These techniques include methods that are illustrated in FIGS. 7 and 9-15, each of which is shown as a set of operations performed by one or more entities.

The illustrated methods are not necessarily limited to the orders or combinations of operations shown in the Figures. Rather, any of the operations may be repeated, omitted, substituted, or re-ordered to implement various aspects described herein. Further, these methods may be used in conjunction with one another, in whole or in part, whether performed by the same entity, separate entities, or any combination of the entities. In portions of the following discussion, reference will be made to the operating environment 100 of FIG. 1 and the wireless network of FIG. 2 by way of example. Such reference is not intended to be limiting any of the described aspects to the operating environment 100 or wireless network 200, but rather as illustrative of one of a variety of examples.

Figure 7:
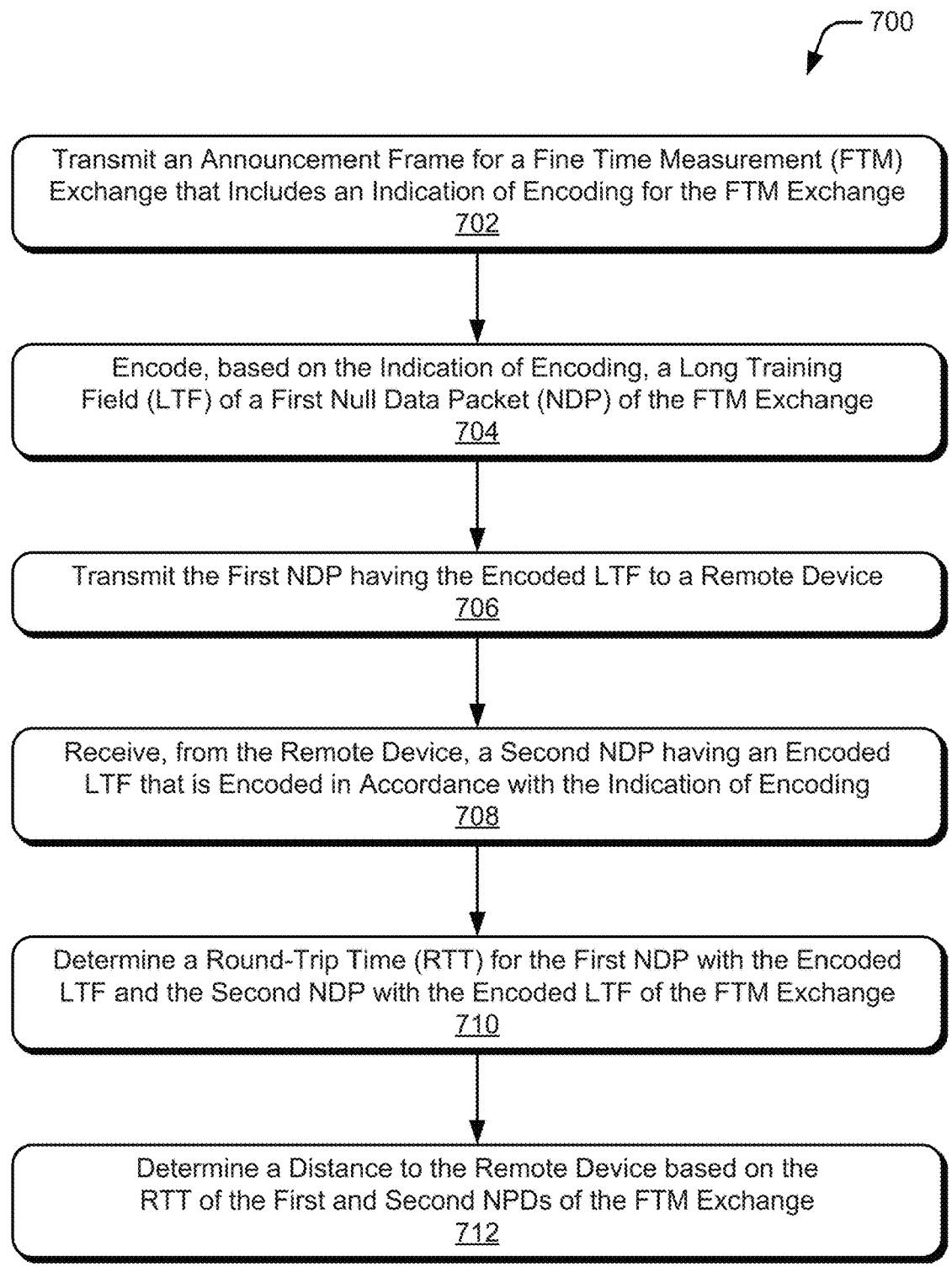
FIG. 7 illustrates an example method for performing a ranging operation in accordance with one or more aspects of secure FTM with encoded LTFs.

FIG. 7 depicts an example method 700 for performing a ranging operation in accordance with secure FTM with encoded LTFs, including operations performed by the secure FTM manager 120.

At 702, an announcement frame for a fine time measurement (FTM) exchange is transmitted. The announcement frame includes an indication of encoding for the FTM exchange. The indication of encoding may be conveyed via any suitable of identifier or bit value of the announcement frame, such as an indication of a codebook, a codebook index, a pilot sequence index (e.g., initial state), a polynomial selection, a key value, a seed value, or the like. The announcement frame may be configured as a null data packet announcement (NDP-A) with the indication of encoding that is encrypted within the NDP-A.

Figure 8:
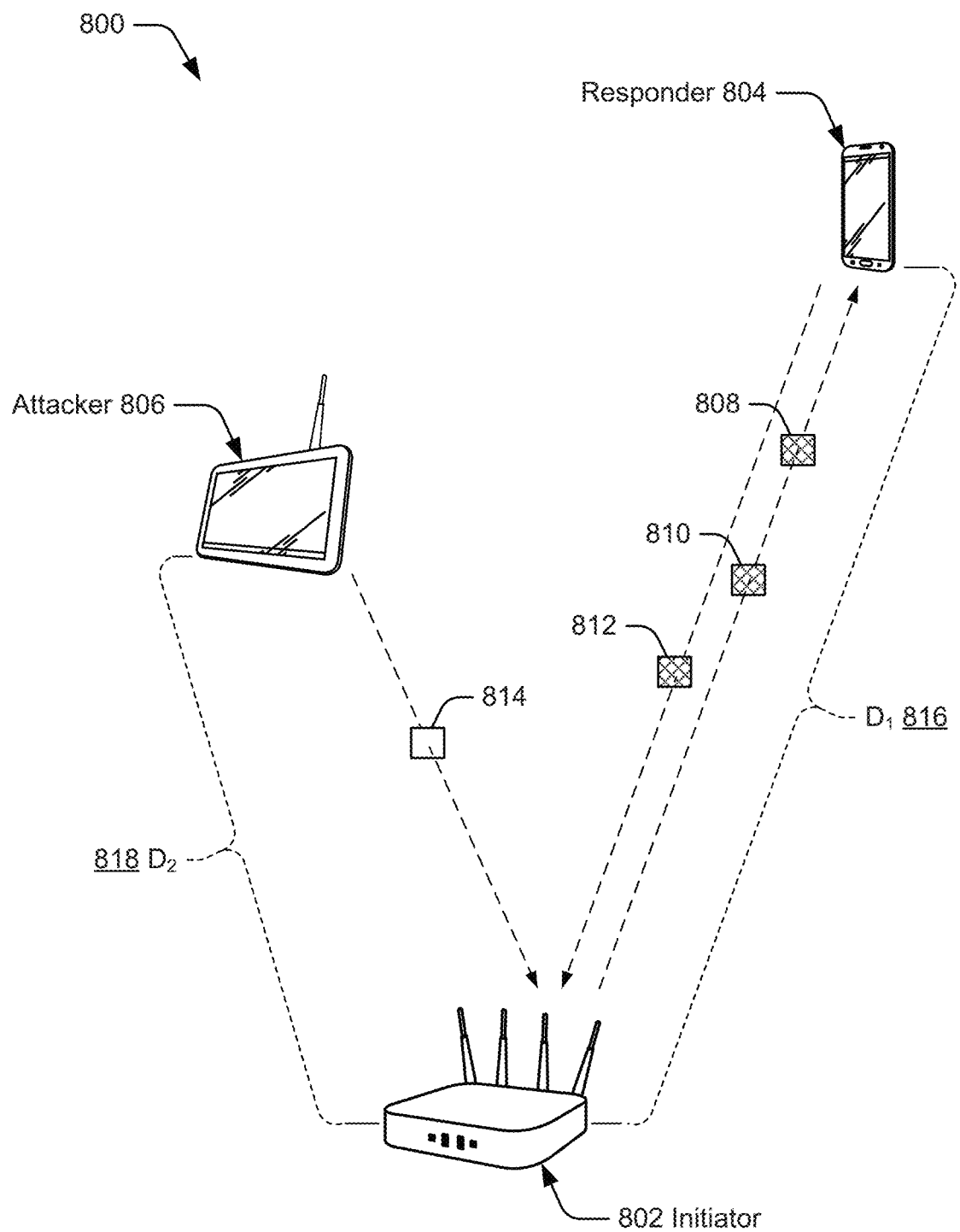
FIG. 8 illustrates an example of implementing secure FTM operations to determine distance between devices of the wireless network of FIG. 2.

By way of example, consider FIG. 8 which illustrates an example of devices implementing secure FTM operations to determine a distance between the devices. The devices may be configured similar to those of the wireless network described with reference to FIG. 2, and in this example include an initiator 802 and a responder 804. Here, assume that the responder 804, a smart-phone, is attempting to access proximity-based features of the initiator 802, an access point that is able to provide access physical access to a building. Also assume that an attacker 806 is attempting to gain unauthorized access to the building and is configured to spoof or replay FTM communications to appear as an authorized device within proximity of the initiator 802. In the context of operation 702, the initiator 802 transmits an NDP-A 808 that includes an indication of codebook selection and a codebook index for generating LTF pilot sequences of an FTM exchange.

At 704, a long training field (LTF) of a first null data packet (NDP) of the FTM exchange is encoded. The LTF of the first NDP can be encoded using any suitable modulation technique, such as binary phase shift keying (BPSK), quadrature phase shift keying (QPSK), or the like. For example, the LTF can be encoded as a BPSK or QPSK modulated pilot sequence generated by using a codebook or polynomial sequence generator. In the context of the present example, the initiator 802 access a codebook in accordance with the indication of encoding and selects a modulated pilot sequence based on the indicated index. The initiator 802 then encodes a first NDP of the FTM exchange with the modulated pilot sequence.

At 706, the first NDP having the encoded LTF is transmitted to a remote device. The first NDP having the encoded LTF can be transmitted to the remote device using one antenna of a transmitting device. In some cases, the first NDP is one of a set of first NDPs that are transmitted via a multiple-input multiple-output (MIMO) communication system. In such cases, a set of first NDPs having respective encoded LTFs may be transmitted to the remote device via multiple antennas of the transmitting device. Continuing the ongoing example, the initiator 802 transmits the first NDP 810 having the encoded LTF to the responder 804.

At 708, a second NDP having an encoded LTF is received from the remote device. The LTF of the second NDP may be encoded in accordance with the indication of encoding previously transmitted with the announcement frame. For example, the LTF of the second NDP can be encoded with a next or incremented pilot sequence obtained from a codebook or polynomial generator. By so doing, the initiator and responder of the FTM exchange are able to know, use, and/or decode the encoded LTFs of the NDPs communicated during the FTM exchange.

In the context of the present example, the initiator 802 receives a second NDP 812 having an encoded LTF, which is encoded using a next pilot sequence from the codebook known to the initiator 802 and responder 804. As such, the initiator 802 is able to determine that the second NDP 812 is a valid NDP of the FTM exchange and reject an NDP 814 with an unencoded LTF that is transmitted by the attacker 806 in an attempt to spoof the second NDP of the FTM exchange.

At 710, a round-trip time (RTT) is determined for the first NDP with the encoded LTF and the second NDP with the encoded LTF. The RTT for the first and second NDPs with encoded LTFs can be determined using a known time of departure of the first NDP and a determined time of arrival of the second NDP. A time of arrival for the first NDP and a time of departure for the second NDP can be received as part of a location measurement report transmitted by the remote device. By using the NDPs with encoded LTFs, a third party or malicious actor is prevented from spoofing or replaying communications of the FTM exchange to alter the determined RTT. Continuing the ongoing example, a secure FTM manager 120 of the initiator 802 determines a round-trip time for the first NDP 810 having the encoded LTF and the second NDP 812 having the encoded LTF.

At 712, a distance to the remote device is determined based on the RTT of the first and second NDPs having the respective encoded LTFs. The distance to the remote device can be determined based on one half of a time of flight for the first and second NDPs having the respective encoded LTFs. Once determined, the distance can be used to enable proximity-based features or services of or for the remote device. Alternately, the distance can be used to disable proximity-based features or services of the remote device, such as when the remote device is determined to exceed a proximity threshold.

Concluding the present example, the secure FTM manager 120 of the initiator 802 determines a distance to the responder 804 as distance $D_1$, which exceeds a proximity threshold for granting physical access to the building. Accordingly, the secure FTM manager 120 (correctly) does not enable or permit physical access to the building based on the FTM exchange with the responder 804. By discarding or rejecting the NDP 814 of the attacker 806 due to lack of proper encoding, the secure FTM manager 120 also prevents the attacker 806 from causing an incorrect ranging of distance $D_2$ that would allow unauthorized access to the building. As such, an FTM exchange of NDPs with encoded LTFs can prevent third parties or malicious actors from spoofing FTM communications to alter determined ranges or corrupt proximity detection.

Figure 9:
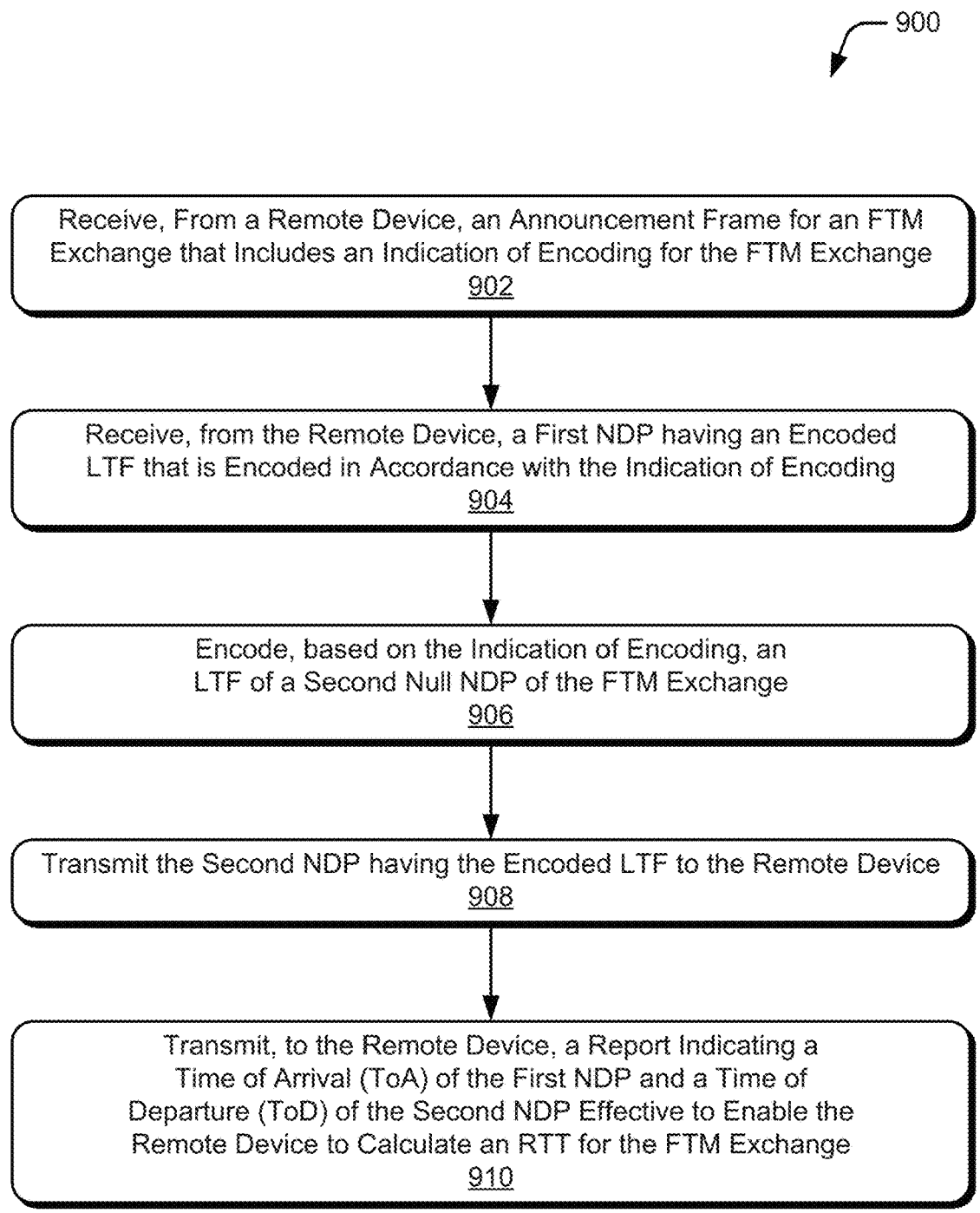
FIG. 9 illustrates an example method for exchanging NDPs with encoded LTFs in accordance with one or more aspects.

FIG. 9 depicts an example method 900 for exchanging NDPs of a secure FTM exchange that have encoded LTFs, including operations performed by the secure FTM manager 120.

At 902, an announcement frame for an FTM exchange is received from a remote device. The announcement frame for the FTM exchange includes an indication of encoding for LTFs of NDPs of the FTM exchange. The announcement frame may be configured as an NDP announcement frame that includes the indication of encoding in an encrypted field. The indication of encoding may be conveyed via any suitable of identifier or bit value of the announcement frame, such as an indication of a codebook, a codebook index, a pilot sequence index (e.g., initial state), a polynomial selection, a key value, a seed value, or the like.

At 904, a first NDP having an encoded LTF that is encoded in accordance with the indication of encoding is received. The LTF of the first NDP may be encoded in accordance with the indication of encoding previously received with the FTM announcement. As such, the first NDP may be identified by the encoding of the LTF, such as a VHT-LTF of the first NDP.

At 906, an LTF of a second NDP is encoded based on the indication of encoding. The LTF of the second NDP may also be encoded in accordance with the indication of encoding previously transmitted with the announcement frame or NDP-A. For example, the LTF of the second NDP can be encoded with a next or incremented pilot sequence obtained from a codebook or polynomial generator. By so doing, the initiator and responder of the FTM exchange are able to know, use, and/or decode the encoded LTFs of the NDPs communicated during the FTM exchange.

At 908, the second NDP having the encoded LTF is transmitted to the remote device. The second NDP having the encoded LTF can be transmitted to the remote device using one antenna of a transmitting device. In some cases, the second NDP is one of a set of second NDPs that are transmitted via a MIMO communication system. In such cases, a set of second NDPs having respective encoded LTFs may be transmitted to the remote device via multiple antennas of the transmitting device.

At 910, a report indicating a time of arrival of the first NDP and a time of departure of the second NDP is transmitted to the remote device. This can be effective to enable the remote device to determine an RTT for the FTM exchange of the first and second NDPs. As described herein, the RTT of the FTM exchange can be determined with the respective ToD and ToA of the first and second NDPs with encoded LTFs. Based on the determined RTT, the remote device can then calculate a distance to the device and/or enable proximity-based services or features responsive to the device being in proximity.

Figure 10:
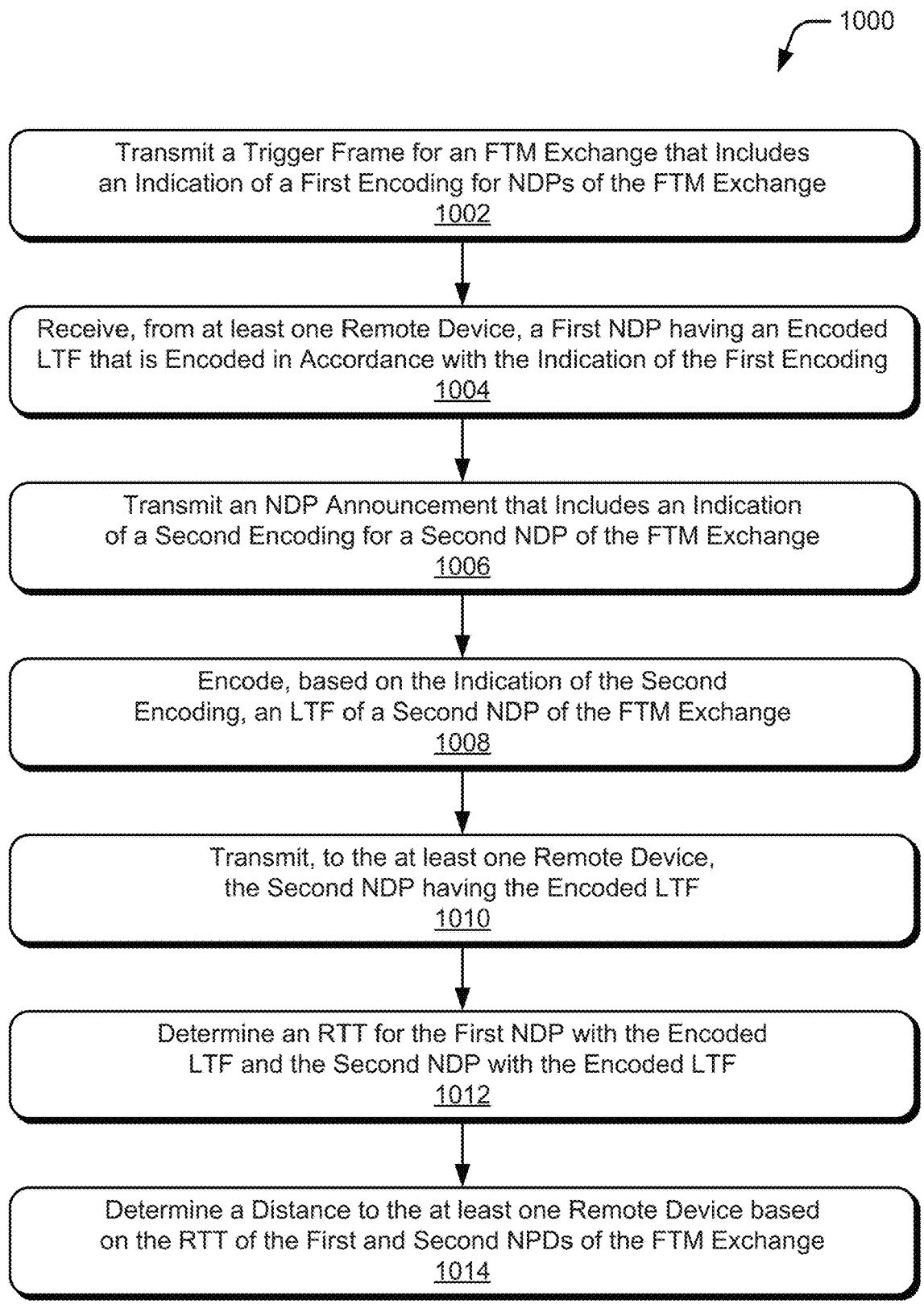
FIG. 10 illustrates an example method for implementing secure FTM operations with multi-user frames in accordance with one or more aspects.

FIG. 10 depicts an example method 1000 for exchanging NDPs of a secure FTM exchange that have encoded LTFs, including operations performed by the secure FTM manager 120.

At 1002, a trigger frame for an FTM exchange is transmitted. The trigger frame includes an indication of a first encoding for NDPs of the FTM exchange. The indication of encoding may be conveyed via any suitable of identifier or information, such as an indication of a codebook, a codebook index, a pilot sequence index, a polynomial selection, a polynomial starting state, a key value, a seed value, or the like. The indication of encoding may be transmitted as an encrypted field or as an unencrypted field of the trigger frame.

At 1004, a first NDP having an encoded LTF is received from at least one remote device. The encoded LTF is encoded in accordance with the indication of the first encoding. As part of a multi-user ranging operation, other respective NDPs with encoded LTFs may also be received from other responding devices. In some cases, the first NDP may be identified by the encoding of the LTF, such as a VHT-LTF of the first NDP that has a known or expected encoding based on the previously transmitted trigger frame.

At 1006, an NDP announcement is transmitted. The NDP announcement includes an indication of second encoding for a second NDP of the FTM exchange. The indication of encoding for the second NDP may be conveyed as any suitable type of information, such as an indication of a codebook, a codebook index, a pilot sequence index (e.g., initial state), a polynomial selection, a key value, a seed value, or the like. Alternately or additionally, a codebook index or polynomial sequence generator may be incremented or advanced to provide encoding for the LTF of the second NDP of the FTM exchange.

At 1008, an LTF of a second NDP is encoded based on the indication of the second encoding. For example, a VHT-LTF of the second NDP can be encoded in accordance with the indication of encoding previously transmitted with the NDP announcement. For example, the LTF of the second NDP can be encoded with a next or incremented pilot sequence obtained from a codebook or polynomial generator. By so doing, the initiator and responder of the FTM exchange are able to know, use, and/or decode the encoded LTFs of the NDPs communicated during the FTM exchange At 1010, the second NDP having the encoded LTF is transmitted to the remote device. The second NDP having the encoded LTF can be transmitted to the remote device using one antenna of a transmitting device. Because the LTF of the second NDP is encoded, a third party or malicious actor is prevented from spoofing or replaying packets of the FTM exchange because they are not aware of or able to predict the LTF encoding.

At 1012, an RTT for the first NDP with the encoded LTF and the second NDP with the encoded LTF is determined. The RTT for the first and second NDPs with encoded LTFs can be determined using a known time of departure of the first NDP and a determined time of arrival of the second NDP. A time of arrival for the first NDP and a time of departure for the second NDP can also be received as part of a location measurement report transmitted by the remote device.

At 1014, a distance to the at least one remote device is calculated based on the RTT of the first and second NDPs of the FTM exchange. The distance to the remote device can be determined based on one half of a time of flight for the first and second NDPs having the respective encoded LTFs. Once determined, the distance can be used to enable proximity-based features or services of or for the remote device.

Figure 11:
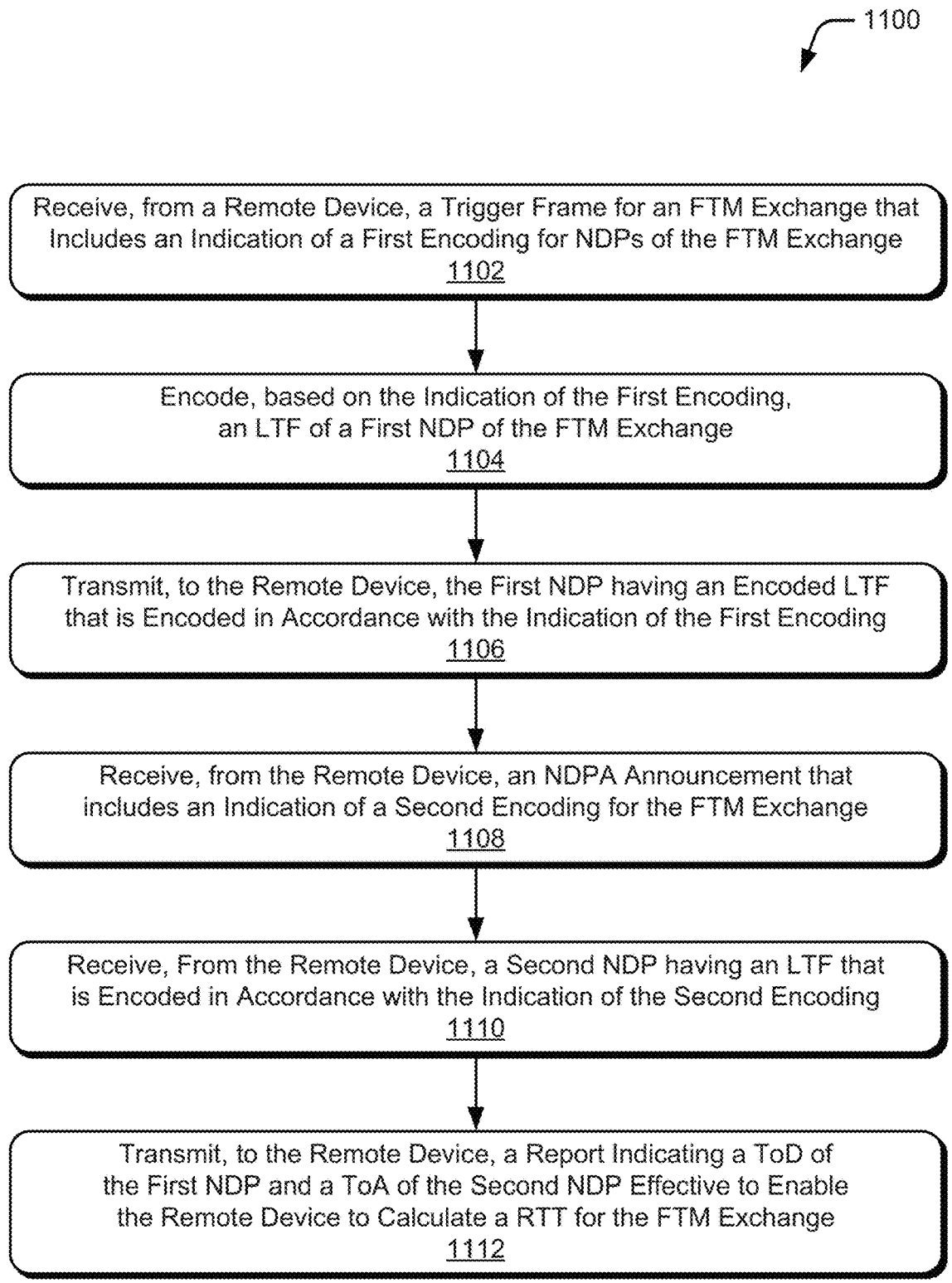
FIG. 11 illustrates an example method for participating in a secure FTM exchange initiated via a multi-user trigger frame.

FIG. 11 depicts an example method 1100 for participating in a secure FTM exchange initiated via a multi-user trigger frame, including operations performed by the secure FTM manager 136.

At 1102, a trigger frame for an FTM exchange is received from a remote device. The trigger frame includes an indication of first encoding for NDPs of the FTM exchange. The indication of encoding may be conveyed via any suitable of identifier or information, such as an indication of a codebook, a codebook index, a pilot sequence index, a polynomial selection, a polynomial starting state, a key value, a seed value, or the like. The indication of encoding may be received as an encrypted field or as an unencrypted field of the trigger frame.

At 1104, an LTF of a first NDP is encoded based on the indication of the first encoding. The LTF of the first NDP can be encoded using any suitable modulation technique, such as BPSK, QPSK, or the like. For example, the LTF can be encoded as a BPSK or QPSK modulated pilot sequence generated by using a codebook or polynomial sequence generator in combination with the indication of encoding.

At 1106, the first NDP having the encoded LTF is transmitted to the remote device. The first NDP having the encoded LTF can be transmitted to the remote device using one antenna of a transmitting device. In some cases, the first NDP is one of a set of first NDPs that are transmitted via a MIMO communication system. In such cases, a set of first NDPs having respective encoded LTFs may be transmitted to the remote device via multiple antennas of the transmitting device (similar to channel sounding operations).

At 1108, an NDP announcement is received from the remote device. The NDP announcement includes an indication of second encoding for the FTM exchange. The indication of encoding for the second NDP may be conveyed as any suitable type of information, such as an indication of a codebook, a codebook index, a pilot sequence index (e.g., initial state), a polynomial selection, a key value, a seed value, or the like. Alternately or additionally, a codebook index or polynomial sequence generator may be incremented or advanced to provide encoding for the LTF of the second NDP of the FTM exchange.

At 1110, a second NDP having an encoded LTF is received from the remote device. The LTF of the second NDP can be encoded in accordance with the indication of the second encoding. Once received, a time of arrival may be determined for the second NDP having the encoded LTF. In some cases, the time of arrival is recorded as a time stamp for subsequent transmission to the remote device.

At 1112, a report indicating a time of departure of the first NDP and a time of arrival of the second NDP is transmitted to the remote device. This can be effective to enable the remote device to determine an RTT for the FTM exchange of the first and second NDPs. As described herein, the RTT of the FTM exchange can be determined with the respective ToD and ToA of the first and second NDPs with encoded LTFs. Based on the determined RTT, the remote device can then calculate a distance to the device and/or enable proximity-based services or features responsive to the device being in proximity.

Figure 12:
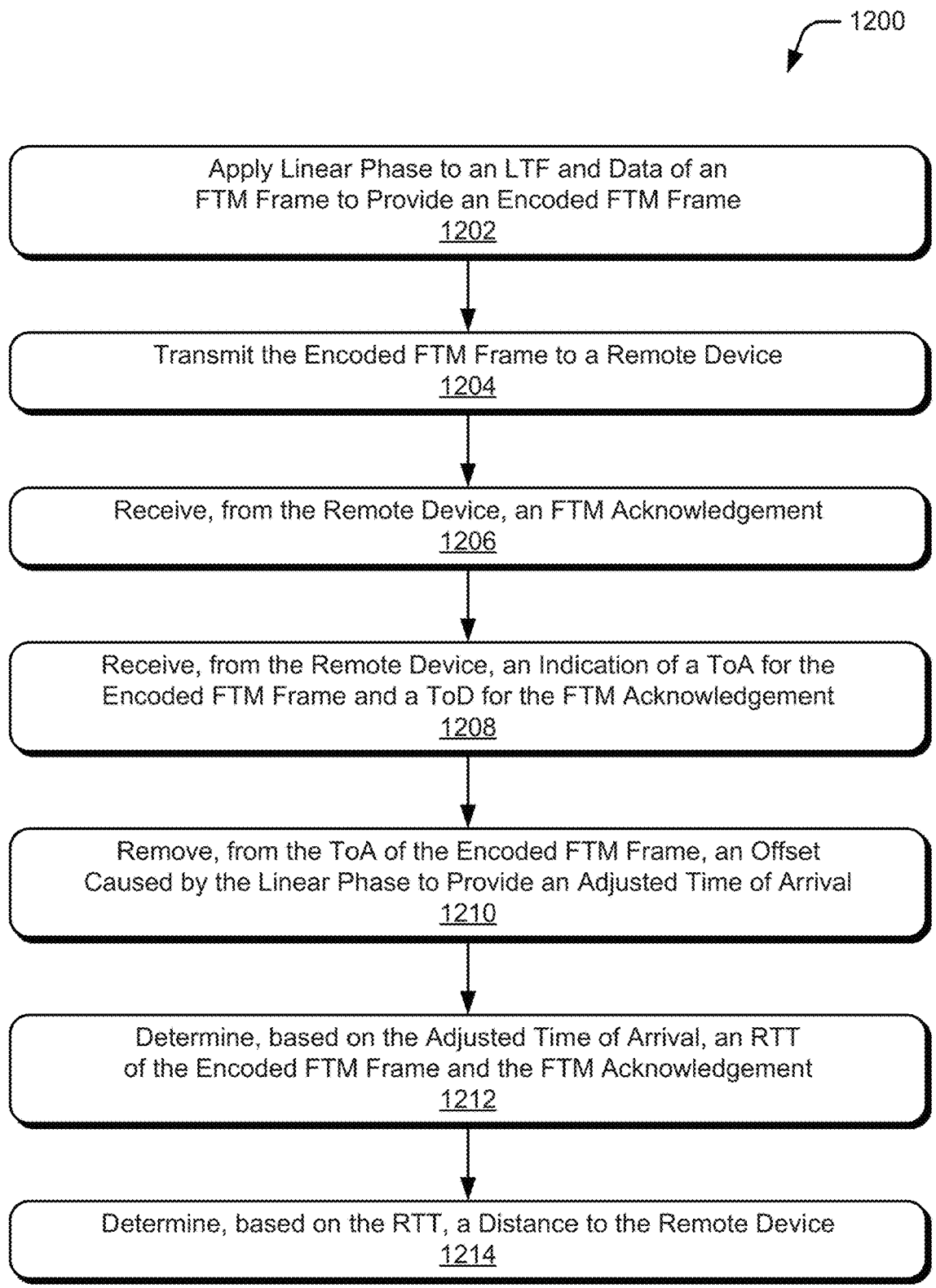
FIG. 12 illustrates an example method for encoding an FTM frame with linear phase for secure FTM.

FIG. 12 depicts an example method 1200 for encoding an FTM frame with linear phase for secure FTM, including operations performed by the secure FTM manager 120.

At 1202, a linear phase is applied to an LTF and data of an FTM frame to provide an encoded FTM frame. The application of the linear phase to the LTF and data of the FTM frame is effective to shift an apparent time of arrival of the FTM frame back or forth. In some cases, the linear phase is configured or set to affect the time or arrival by approximately 50 to 100 nanoseconds. Additionally, the application of the linear phase to the FTM frame does not affect decoding of the FTM frame, such that any receiving device can still decode the encoded FTM frame.

At 1204, the encoded FTM frame is transmitted to a remote device. The encoded FTM frame is transmitted to the remote device using one antenna of a transmitting device. As noted, the application of the linear phase to the LTF and data of the encoded FTM frame can affect an apparent time of arrival of the encoded FTM frame yet does not affect a perceived channel through which the linearly-phase encoded FTM frame travels.

At 1206, an FTM acknowledgment is received from the remote device. The FTM acknowledgment may also be encoded with phase encoding. When encoded with linear phase, the time of arrival of the FTM acknowledgment may appear shifted or offset. As such, if the remote device encodes the FTM acknowledgment with linear phase, the time of arrival can be adjusted to account for the shift or offset caused by the linear phase encoding of the FTM acknowledgment to provide an adjusted time of arrival (e.g., $t_4$).

At 1208, an indication of a time of arrival (ToA) for the encoded FTM frame and a time of departure (ToD) of for the FTM acknowledgment is received from the remote device. In some cases, separate indications for the ToA of the encoded FTM frame and the ToD of the encoded FTM acknowledgment are received from the remote device. The indication of the ToA and ToD can be received from the remote device as part of a subsequent FTM exchange, such as time stamps associated with subsequently received FTM frames.

At 1210, an offset caused by the linear phase encoding is removed from the ToA of the encoded FTM frame to provide an adjusted time of arrival. The offset may be calculated based on the linear phase that is applied to encode the FTM frame at operation 1202. Alternately, the remote device may account for the offset associated with the application of linear phase to provide adjusted time stamps that do not require adjustment or offset removal.

At 1212, an RTT for the encoded FTM frame and FTM acknowledgment is determined based on the adjusted time of arrival. Along with the adjust time of arrival, the RTT can be determined with other respective communication times (e.g., ToD and ToA) of the encoded FTM frame and encoded FTM acknowledgment. By using the linear-phase encoded FTM frame and FTM acknowledgment with the shifted times of arrival, a third party or malicious actor can be prevented from spoofing or replaying communications of the FTM exchange to alter the determined RTT.

At 1214, a distance to the remote device is determined based on the RTT with the adjusted time of arrival. The distance to the remote device can be determined based on one half of a time of flight for the encoded FTM frame and encoded FTM acknowledgment. Once determined, the distance can be used to enable proximity-based features or services for the remote device. Alternately, the distance can be used to disable proximity-based features or services for the remote device, such as when the remote device is determined to exceed a proximity threshold.

Figure 13:
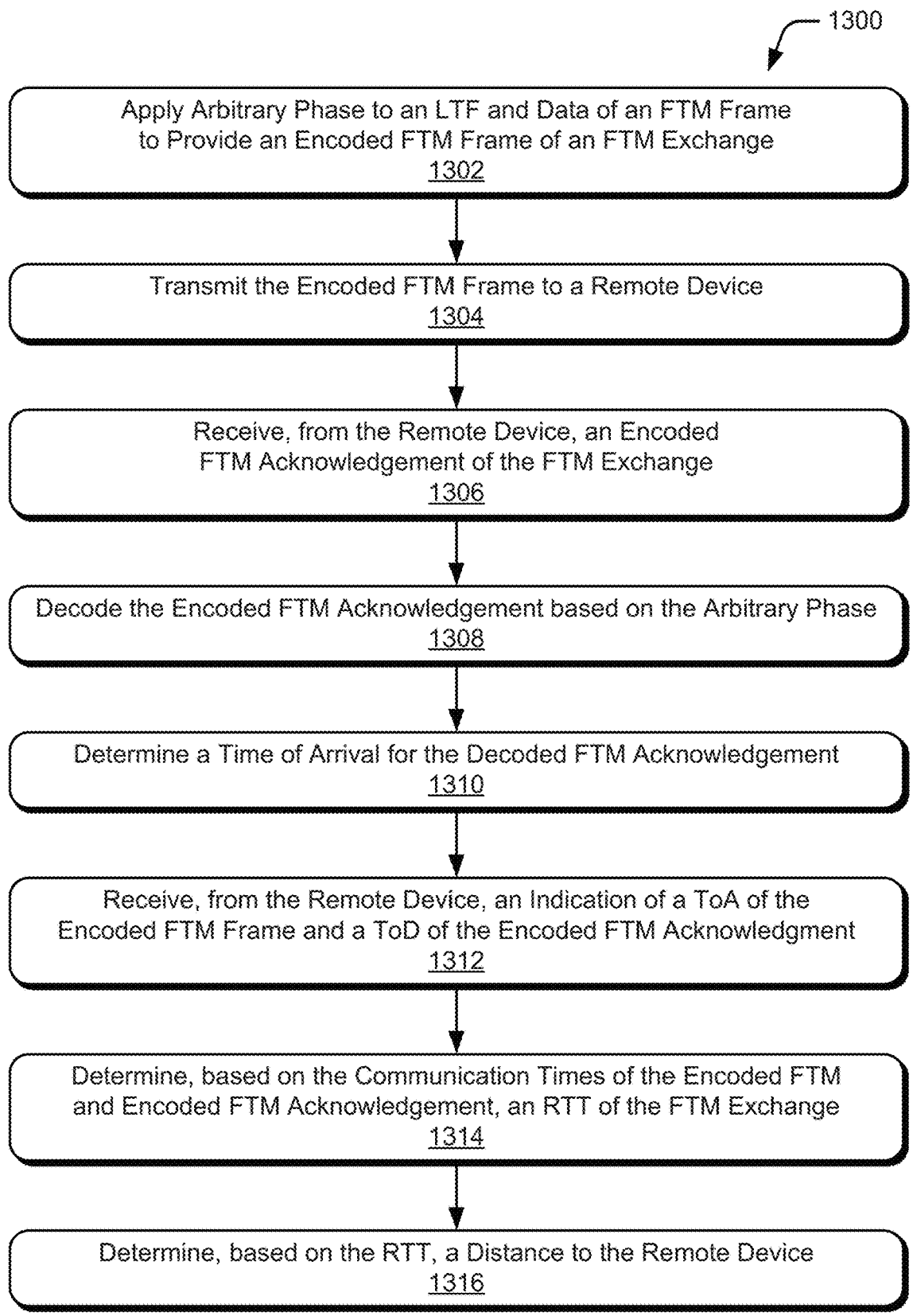
FIG. 13 illustrates an example method for exchanging an FTM frame and acknowledgment encoded with arbitrary phase.

FIG. 13 depicts an example method 1300 for exchanging an FTM frame and acknowledgment encoded with arbitrary phase, including operations performed by the secure FTM manager 120.

At 1302, an arbitrary phase is applied to an LTF and data of an FTM exchange to provide an encoded FTM frame. The arbitrary phase is applied to a VHT or other non-legacy type LTF of the FTM frame. The arbitrary phase can be generated or applied to the LTF by using beamforming hardware or processing. In some cases, an indication of a phase sequence of the arbitrary phase is inserted or encoded into a MAC protocol data unit of the FTM frame. Additionally, linear phase encoding may be applied to a legacy preamble of the encoded FTM frame for increased security.

At 1304, the encoded FTM frame is transmitted to a remote device. The encoded FTM frame is transmitted via one antenna of a device. With the arbitrary phase encoding, a perceived channel through which the encoded FTM frame is communicated may appear scrambled or distorted. This can be effective to prevent third parties or malicious actors from being able to spoof or replay communications of the FTM exchange.

At 1306, an encoded FTM acknowledgment is received from the remote device. In some cases, the encoded FTM acknowledgment includes a VHT-ACK that is encoded with the phase sequence of the encoded FTM frame. Alternately or additionally, a linear phase encoding may be applied to a legacy preamble of the VHT-ACK for increased security.

At 1308, the encoded FTM acknowledgment is decoded based on the arbitrary phase. In some cases, the remote device may encode the FTM acknowledgment using the phase sequence of the encoded FTM frame that was previously transmitted to the remote device. As such, the phase sequence of the arbitrary phase can be used to decode the encoded FTM acknowledgment that is received from the remote device.

At 1310, a time of arrival for the decoded FTM acknowledgment is determined. For time of arrival processing of the encoded FTM acknowledgment, the phase sequence used to encode the FTM frame may be used to process raw LTF data of the encoded FTM acknowledgment. Without knowledge of the phase sequence, third parties or malicious actors are unable to determine or spoof a time of arrival of the FTM acknowledgment.

At 1312, an indication of a time of arrival (ToA) of the encoded FTM frame and a time of departure (ToD) of the encoded FTM acknowledgment is received from the remote device. In some cases, separate indications for the ToA of the encoded FTM frame and the ToD of the encoded FTM acknowledgment are received from the remote device. The indication of the ToA and ToD can be received from the remote device as part of a subsequent FTM exchange, such as time stamps associated with subsequently received FTM frames.

At 1314, an RTT of the FTM exchange is calculated based on respective communication times (e.g., ToD and ToA) the encoded FTM frame and encoded FTM acknowledgment. As described herein, the RTT of the FTM exchange can be determined with the respective ToD and ToA of the encoded FTM frame and the encoded FTM acknowledgment. By using the encoded FTM frame and encoded FTM acknowledgment, a third party or malicious actor is prevented from spoofing or replaying communications of the FTM exchange to alter the determined RTT.

At 1316, a distance to the remote device is determined based on the RTT. The distance can be determined based on one half of a time of flight for the encoded FTM frame and encoded FTM acknowledgment. Once determined, the distance can be used to enable proximity-based features or services for the remote device. Alternately, the distance can be used to disable proximity-based features or services for the remote device, such as when the remote device is determined to exceed a proximity threshold.

Figure 14:
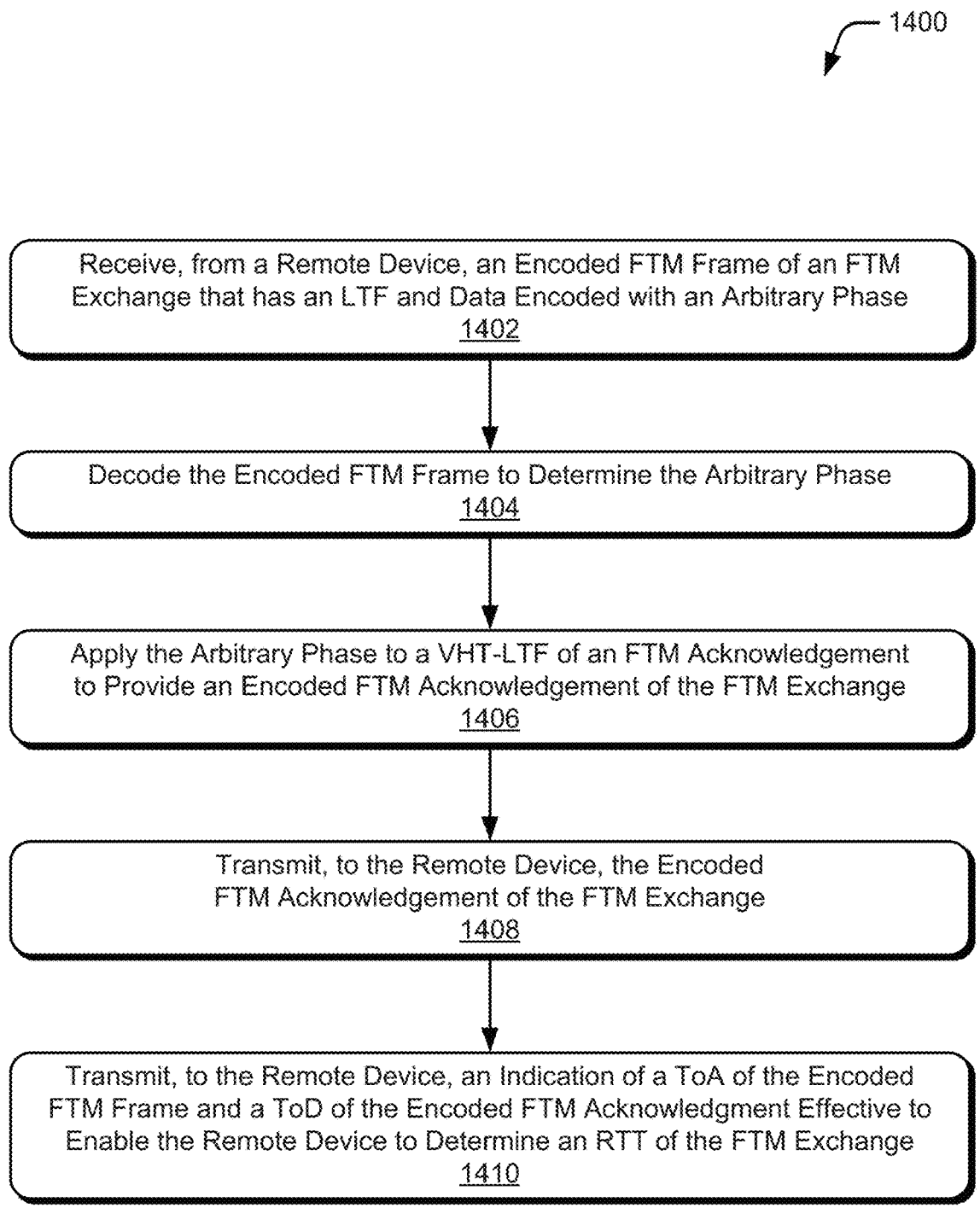
FIG. 14 illustrates another example method for exchanging an FTM frame and acknowledgment encoded with arbitrary phase.

FIG. 14 depicts another example method 1400 for exchanging an FTM frame and acknowledgment encoded with arbitrary phase, including operations performed by the secure FTM manager 136.

At 1402, an encoded FTM frame is received from a remote device and encoded with an arbitrary phase. The encoded FTM frame includes an LTF and data encoded with the arbitrary phase. The arbitrary phase may be applied to a VHT or other non-legacy type LTF of the encoded FTM frame. In some cases, a MAC protocol data unit of the encoded FTM frame includes an indication of a phase sequence of the arbitrary phase. Additionally, a legacy preamble of the encoded FTM frame may be encoded with a linear phase for increased security.

At 1404, the encoded FTM frame is decoded to determine the arbitrary phase. The MAC protocol data unit of the encoded FTM frame may be decoded to determine a sequence of the arbitrary phase. For time of arrival processing of the encoded FTM frame, raw data of the LTF of the encoded FTM may be stored until the MAC protocol data unit is decoded to determine or obtain a phase sequence of the arbitrary phase encoding.

At 1406, the arbitrary phase is applied to a VHT-ACK of an FTM acknowledgment to provide an encoded FTM acknowledgment. Alternately or additionally, a linear phase encoding may be applied to a legacy preamble of the VHT-ACK for increased security.

At 1408, the encoded FTM acknowledgment is transmitted to the remote device. The encoded FTM acknowledgment is transmitted via one antenna of the device. With the arbitrary phase encoding, a perceived channel through which the encoded FTM acknowledgement is communicated may appear scrambled or distorted. This can be effective to prevent third parties or malicious actors from being able to spoof or replay communications of the FTM exchange.

At 1410, an indication of a time of arrival of the encoded FTM frame and a time of departure of the encoded FTM acknowledgment are transmitted to the remote device. This can be effective to enable the remote device to determine an RTT of the FTM exchange for ranging or proximity-based operations. As described herein, the RTT of the FTM exchange can be determined with the respective ToD and ToA of the encoded FTM frame and the encoded FTM acknowledgment. Based on the determined RTT, the remote device can then calculate a distance to the device and/or enable proximity-based services or features responsive to the device being in proximity.

Figure 15:
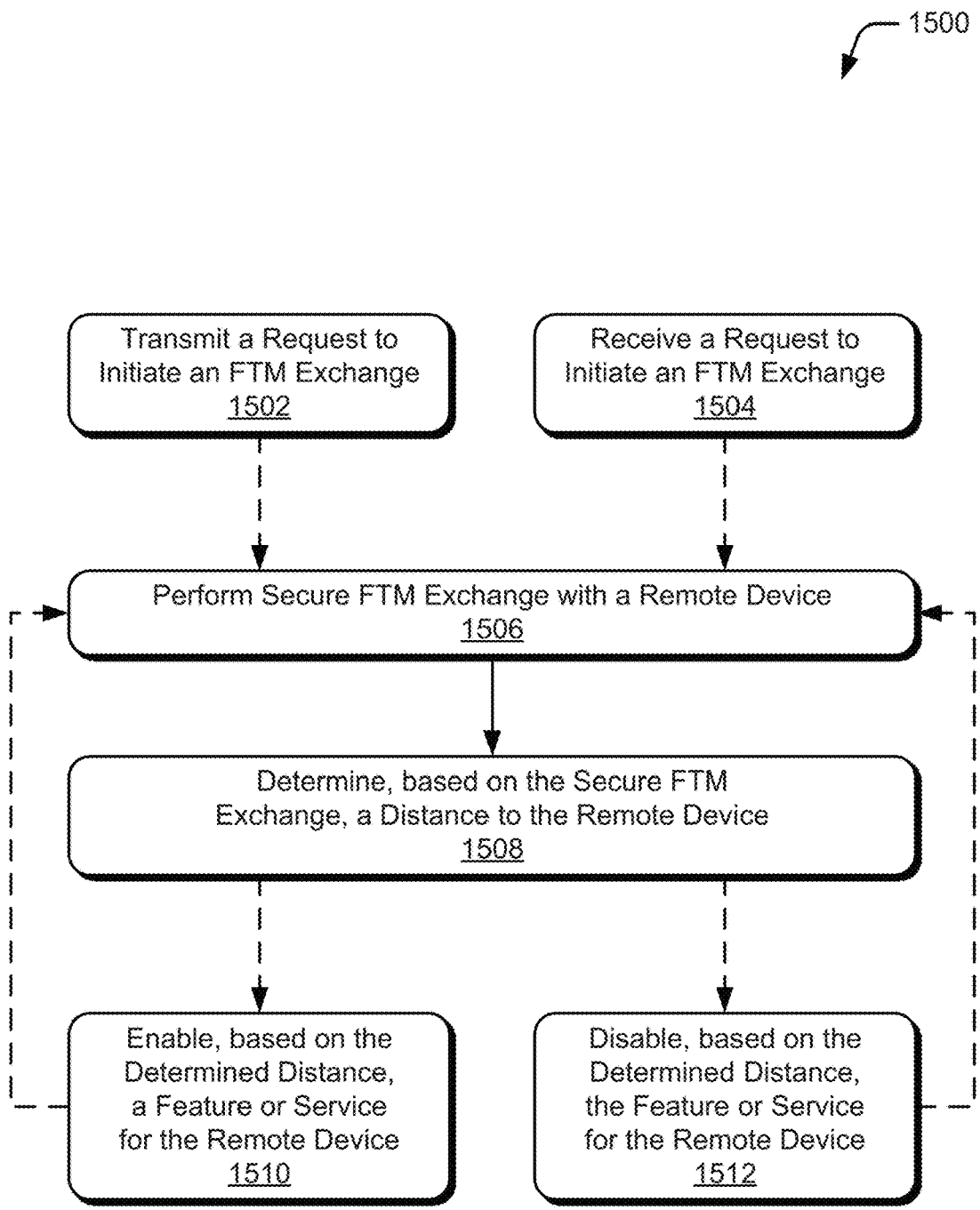
FIG. 15 illustrates an example method for providing a feature or service based on a secure FTM exchange in accordance with one or more aspects.

FIG. 15 depicts an example method 1500 for providing a feature or service based on a secure FTM exchange, including operations performed by the secure FTM manager 120 or secure FTM manager 136.

Optionally at 1502, a request to initiate an FTM exchange is transmitted. In some cases, an initiator transmits a request to a responder to initiate the FTM exchange. The request may include an NDP-A or trigger frame that includes an indication of encoding for LTFs of NDPs of the FTM. In other cases, an FTM frame or FTM request is transmitted to the responder as part of an FTM setup or negotiation phase before an FTM operation is performed.

Optionally at 1504, a request to initiate an FTM exchange is received. The request can be received by a responder of the FTM exchange. The received request may include an NDP-A or trigger frame that includes an indication of encoding for LTFs of NDPs of the FTM. In other cases, an FTM frame or FTM request is received by the responder as part of an FTM setup or negotiation phase with an initiator before an FTM operation is performed.

At 1506, a secure FTM exchange is performed with a remote device. The secure FTM exchange can be performed in accordance with the methods described with reference to FIGS. 7 and 9-14. The secure FTM exchange is performed with an NDP, FTM frame, or FTM acknowledgment having an encoded LTF. One or more of the LTFs of the secure FTM exchange can be encoded using pilot sequences of a codebook or polynomial generator. Alternately, one or more of the LTFs of an FTM frame or FTM acknowledgment may be encoded with linear or arbitrary phase.

At 1508, a distance to the remote device is determined based on the secure FTM exchange. Determining the distance to the remote device includes determining an RTT for NDPs or packets of the secure FTM exchange. By performing the secure FTM exchange with encoded LTFs, third parties or malicious actors are prevented from spoofing or replaying FTM communications to alter the distance determined based on the RTT of the NDPs or packets of the secure FTM exchange.

Optionally at 1510, a feature or service is enabled based on the determined distance. In some cases, the determined distance is compared to a predefined threshold by which proximity is determined. In such cases, a feature or service may be enabled when the determined distance is equal or less than the predefined threshold. For example, when a vehicle-based network controller determines that a wireless-enable key fob is within a predefined distance of a vehicle, the vehicle-based network controller can start an engine of the car or unlock door locks of the car to grant the possessor of the key fob physical access.

Optionally at 1512, a feature or service is disabled based on the determined distance. In some cases, the determined distance is compared to a predefined threshold by which proximity is determined. In such cases, a feature or service may be disabled when the determined distance is equal or greater than the predefined threshold. For example, when the vehicle-based network controller determines that the wireless-enable key fob is outside of the predefined distance of the vehicle, the vehicle-based network controller can lock the door locks of the car to prevent unauthorized physical access while the driver is away.

From operation 1510 or 1512, the method 1500 may return to operation 1506 to perform another secure FTM exchange with the remote device. After enabling or disabling a proximity-based feature or service, the operations of the method 1500 may be repeated to determine if proximity status with the remote device has changed. In some cases, the operations of the method 1500 are repeated at predefined intervals of time, which may be adjusted based on the remote device's range with respect to the proximity threshold. In other cases, the operations of the method 1500 can be repeated at random times or responsive to detection of wireless communication with the remote device (or another device entering communications range).

System-on-Chip

Figure 16:
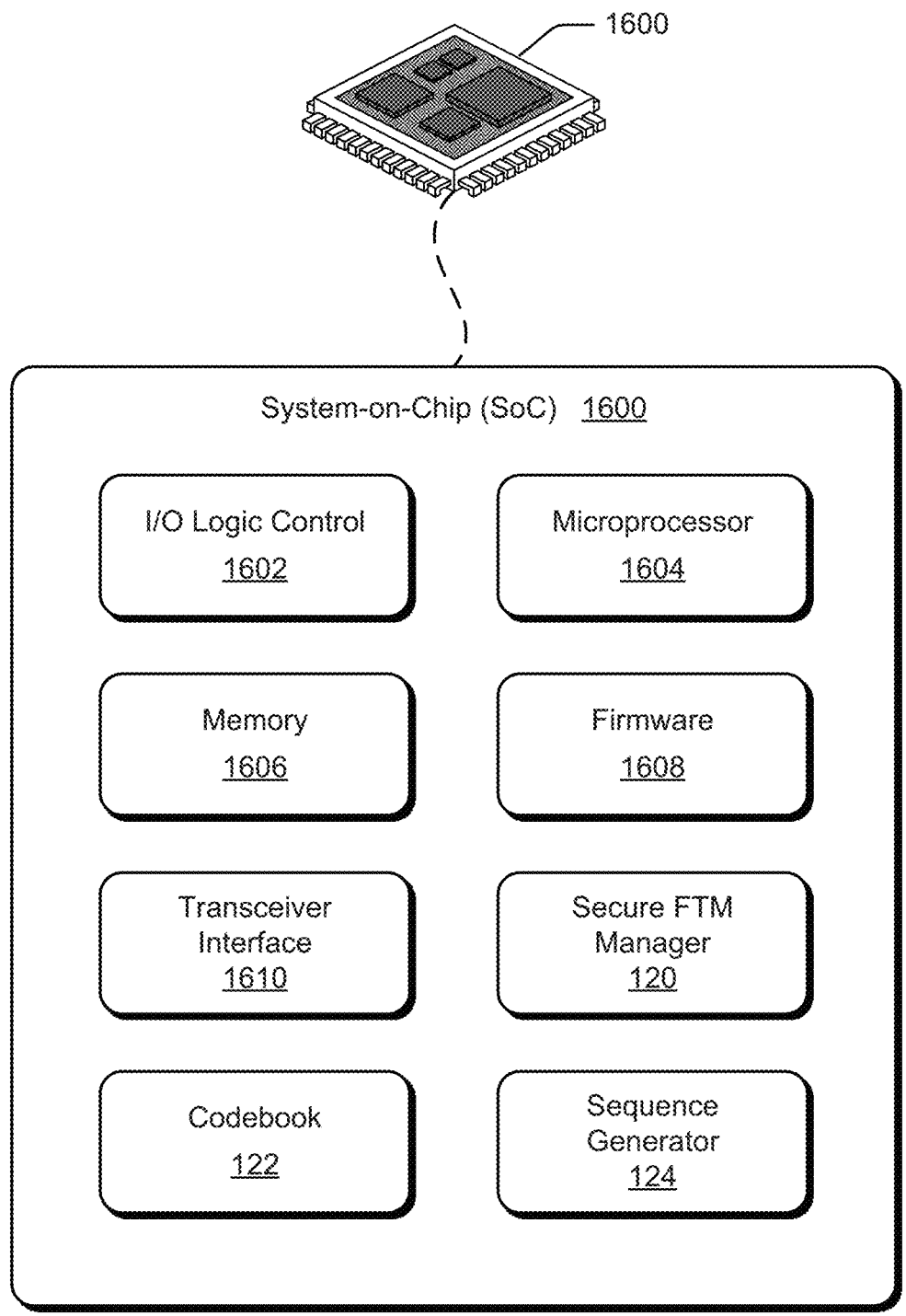
FIG. 16 illustrates an example System-on-Chip (SoC) environment for implementing aspects of secure FTM with encoded LTFs.

FIG. 16 illustrates an exemplary System-on-Chip (SoC) 1600 that can implement various aspects of secure fine timing measurement with encoded long training fields. The SoC 1600 can be implemented in any suitable device, such as an access point, wireless router, station management entity, set-top box, wireless base station, drone controller, server, mesh networking node, network-attached storage, smart appliance, or any other suitable type of device. Although described with reference to a SoC, the entities of FIG. 16 may also be implemented as a network interface controller (NIC), application-specific standard part (ASSP), digital signal processor (DSP), programmable SoC (PSoC), or field-programmable gate array (FPGA). With reference to the devices described herein, the SoC 1600 may be embodied in, or implement functionalities of, an FTM initiator or an FTM responder in accordance with one or more aspects of secure FTM.

The SoC 1600 can be integrated with electronic circuitry, a microprocessor, memory, input-output (I/O) logic control, communication interfaces, other hardware, firmware, and/or software useful to provide functionalities of a device, such as any of the devices listed herein. The SoC 1600 may also include an integrated data bus (not shown) that couples the various components of the SoC for data communication between the components. The integrated data bus or other components of the SoC 1600 may be exposed to or enable access of external components, such as for wireless communication. For example, the SoC 1600 may be implemented as a baseband processor or modem for managing or controlling a transceiver or other hardware to communicate over a wireless medium.

In this example, the SoC 1600 includes various components such as input-output (I/O) logic control 1602 (e.g., to include electronic circuitry) and a microprocessor 1604 (e.g., any of a microcontroller, processor core, application processor, or DSP). The SoC 1600 also includes memory 1606, which can be any type and/or combination of RAM, SRAM, DRAM, low-latency nonvolatile memory, ROM, one-time programmable (OTP) memory, and/or other suitable electronic data storage. In the context of this disclosure, the memory 1606 stores data, instructions, or other information via non-transitory signals, and does not include carrier waves or other transitory signals.

Alternately or additionally, the SoC 1600 may comprise a data interface (not shown) for accessing additional or expandable off-chip memory, such as external SRAM or flash memory. In some cases, the SoC 1600 includes various applications, operating systems, and/or software, such as firmware 1608, which can be computer-executable instructions maintained by the memory 1606 and executed by the microprocessor 1604. In this example, the SoC 1600 includes a transceiver interface 1610 for controlling or communicating with components of a local or off-chip wireless transceiver. Generally, the transceiver interface 1610 may be implemented with or to control components, such as the transmitter 126 and receiver 128, to facilitate communication between devices of a wireless network.

The SoC 1600 also includes a secure FTM manager 120, codebook 122, and sequence generator 124, which may be embodied as disparate or combined components, as described in relation to aspects presented herein. Although not shown, the SoC 1600 may also include time domain capabilities and/or frequency domain capabilities to implement various aspects of secure FTM. Examples of these components and/or entities, and their corresponding functionality, are described with reference to the respective components of the environment 100 shown in FIG. 1 and wireless network shown in FIG. 2. Further, although described with reference to components of a host device 102, an SoC 1600 may also be implemented as and with components of a client device 104 of the environment 100 (e.g., secure FTM manager 136). The secure FTM manager 120, either in whole or part, can be implemented as processor-executable instructions (e.g., firmware 1608) maintained by the memory 1606 and executed by the microprocessor 1604 to implement various aspects and/or features of secure fine timing measurement with encoded long training fields as described herein.

The secure FTM manager 120, either independently or in combination with other entities, can be implemented with any suitable combination of components or circuitry to implement various aspects and/or features described herein. The secure FTM manager 120 may also be provided integral with other entities of the SoC 1600, such as integrated with the microprocessor 1604, a network interface controller, or the transceiver interface 1610 the SoC 1600. Alternately or additionally, the secure FTM manager 120 and the other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method for a secure fine timing measurement, the method comprising:
    transmitting, by a first device and via a wireless medium, an announcement frame for a fine timing measurement (FTM) exchange, wherein the announcement frame includes an encoding key value for the encoded FTM exchange;
    encoding, based on the encoding key value, a first long training field (LTF) of a first null data packet (NDP) of the FTM exchange;
    transmitting, to a second device, the first NDP having the first encoded LTF;
    receiving, from the second device, a second NDP having a second encoded LTF; and
    determining a round-trip time for the first NDP having the first encoded LTF and the second NDP having the second encoded LTF.

2. The method as recited in claim 1, further comprising determining a distance between the first device and the second device based on the round-trip time of the first NDP having the first encoded LTF and the second NDP having the second encoded LTF.

3. The method as recited in claim 2, further comprising:
    comparing the distance to a predefined threshold; and
    enabling, responsive to the distance being less than the predefined threshold, the second device to access a service or feature managed by the first device.

4. The method as recited in claim 1, wherein the first encoded LTF of the first NDP is encoded with an encoding that is different from an encoding of the second encoded LTF of the second NDP.

5. The method as recited in claim 1, wherein the announcement frame comprises an NDP announcement frame that includes the encoding key value.

6. The method as recited in claim 5, wherein:
    the encoding key value includes an identifier of a codebook selection or a codebook index; or
    the encoding key value includes a seed value for a polynomial-based encoding sequence generator.

7. The method as recited in claim 5, wherein the encoding key value in the NDP announcement frame is not encrypted.

8. The method as recited in claim 5, wherein the encoding key value in the NDP announcement frame is encrypted via media access control (MAC) level encryption.

9. A System-on-Chip (SoC) for secure fine timing measurement, the SoC comprising:
    a wireless communication controller;
    a secure fine timing measurement (FTM) manager implemented at least partially in hardware and configured to:
        transmit, via the wireless communications controller, an announcement frame for an FTM exchange, wherein the announcement frame includes an encoding key value for the FTM exchange;
        encode, based on the encoding key value, a first long training field (LTF) of a first null data packet (NDP) of the FTM exchange;
        transmit, via the wireless communications controller, the first NDP having the first encoded LTF to a remote device;
        receive, via the wireless communication controller and from the remote device, a second NDP having a second encoded LTF; and
        determine a round-trip time for the first NDP having the first encoded LTF and the second NDP having the second encoded LTF.

10. The SoC as recited in claim 9, wherein the secure FTM manager is further configured to determine a distance between a device in which the SoC is embodied and the remote device based on the round-trip time of the first NDP having the first encoded LTF and the second NDP having the second encoded LTF.

11. The SoC as recited in claim 10, wherein the secure FTM manager is further configured to:
    compare the distance to a predefined threshold; and
    enable, responsive to the distance being less than the predefined threshold, the remote device to access a service or feature managed by secure FTM manager of the SoC.

12. The SoC as recited in claim 9, wherein:
    to encode the first LTF of the first NDP the secure FTM manager encodes a first very high throughput (VHT) LTF of the first NDP; or
    the second encoded LTF of the second NDP is a second VHT LTF of the second NDP.

13. The SoC as recited in claim 12, wherein the first VHT LTF of the first NDP is encoded, the second VHT LTF of the second NDP is encoded, and the first encoded VHT LTF of the first NDP is encoded with a pilot sequence that is different from a pilot sequence of the second encoded VHT LTF of the second NDP.

14. The SoC as recited in claim 9, wherein the announcement frame comprises an NDP announcement frame that includes the encoding key value for the FTM exchange.

15. The SoC as recited in claim 9, wherein:
    the SoC further comprises a memory storing one or more codebooks useful to encode the LTF of the first NDP; and
    the encoding key value includes an indication identifier of a codebook selection or a codebook index.

16. The SoC as recited in claim 9, wherein the encoding key value includes a seed value for a polynomial-based encoding sequence generator.

17. A computer-readable storage media comprising instructions that, responsive to execution by a hardware-based processor, implement a secure fine timing measurement (FTM) manager to:
    transmit, via a wireless interface of a device, an announcement frame for an FTM exchange, wherein the announcement frame includes an encoding key value for the FTM exchange;
    encode, based on the encoding key value, a first long training field (LTF) of a first null data packet (NDP) of the FTM exchange;
    transmit, via the wireless interface, the first NDP having the first encoded LTF to a remote device;
    receive, via the wireless interface and from the remote device, a second NDP having a second encoded LTF; and
    determine a round-trip time for the first NDP having the first encoded LTF and the second NDP having the second encoded LTF.

18. The computer-readable storage media as recited in claim 17, wherein the secure FTM manager is further implemented to:

determine a distance between the device and the remote device based on the round-trip time of the first NDP having the first encoded LTF and the second NDP having the second encoded LTF;

compare the distance to a predefined threshold; and enable, responsive to the distance being less than the predefined threshold, the remote device to access a service or feature managed by secure FTM manager.

19. The computer-readable storage media as recited in claim 17, wherein the announcement frame comprises an NDP announcement frame that includes the encoding key value; and the encoding key value includes an identifier of a codebook selection or a codebook index; or the encoding key value includes a seed value for a polynomial-based encoding sequence generator.

20. The computer-readable storage media as recited in claim 19, wherein the encoding key value is encrypted within the NDP announcement frame.

\* \* \* \* \*